(12) United States Patent
Morton et al.

(10) Patent No.: US 11,547,532 B2
(45) Date of Patent: Jan. 10, 2023

(54) METHOD TO MODIFY ALIGNER BY MODIFYING TOOTH POSITION

(71) Applicant: Align Technology, Inc., San Jose, CA (US)

(72) Inventors: John Morton, San Jose, CA (US); Mitra Derakhshan, Herndon, VA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/164,287

(22) Filed: Oct. 18, 2018

(65) Prior Publication Data
US 2019/0046295 A1    Feb. 14, 2019

Related U.S. Application Data

(63) Continuation of application No. 14/985,904, filed on Dec. 31, 2015.

(60) Provisional application No. 62/099,965, filed on Jan. 5, 2015.

(51) Int. Cl.
| | |
|---|---|
| *A61C 7/08* | (2006.01) |
| *A61C 7/14* | (2006.01) |
| *A61C 7/00* | (2006.01) |
| *A61C 7/06* | (2006.01) |

(52) U.S. Cl.
CPC ............... *A61C 7/08* (2013.01); *A61C 7/002* (2013.01); *A61C 7/06* (2013.01); *A61C 7/14* (2013.01)

(58) Field of Classification Search
CPC .. A61C 7/08; A61C 7/002; A61C 7/06; A61C 7/14

USPC ............................................................ 433/6
See application file for complete search history.

(56) References Cited

U.S. PATENT DOCUMENTS

| | | | |
|---|---|---|---|
| 2,467,432 | A | 4/1949 | Kesling |
| 3,407,500 | A | 10/1968 | Kesling |
| 3,600,808 | A | 8/1971 | James |
| 3,660,900 | A | 5/1972 | Andrews |
| 3,683,502 | A | 8/1972 | Lawrence |
| 3,738,005 | A | 6/1973 | Cohen et al. |
| 3,860,803 | A | 1/1975 | Levine |

(Continued)

FOREIGN PATENT DOCUMENTS

| | | |
|---|---|---|
| AU | 3031677 A | 5/1979 |
| AU | 517102 B2 | 7/1981 |

(Continued)

OTHER PUBLICATIONS

AADR. American Association for Dental Research, Summary of Activities, Mar. 20-23, 1980, Los Angeles, CA, p. 195.

(Continued)

*Primary Examiner* — Edward Moran
*Assistant Examiner* — Matthew P Saunders
(74) *Attorney, Agent, or Firm* — FisherBroyles, LLP

(57) ABSTRACT

Polymeric shell appliances are provided in which the polymeric shell appliances are configured to provide one or more activation forces to facilitate tooth movement. In many embodiments, the activation forces are arranged to provide force in a direction opposite to an intended direction of tooth movement. The polymeric shell appliances may comprise one or more tooth receiving cavities, in which each of the plurality of tooth receiving cavities is shaped and arranged to provide a counter moment of each of the plurality of teeth.

23 Claims, 9 Drawing Sheets

(56) References Cited

U.S. PATENT DOCUMENTS

| | | |
|---|---|---|
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A | 7/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | Van Der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | Van et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |
| 6,062,861 A | 5/2000 | Andersson |
| 6,068,482 A | 5/2000 | Snow |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,299,440 B1 * | 10/2001 | Phan ................. A61C 7/00 433/18 |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier |
| 6,394,801 B2 | 5/2002 | Chishti et al. |
| 6,398,548 B1 | 6/2002 | Muhammad et al. |
| 6,402,707 B1 | 6/2002 | Ernst |
| 6,450,807 B1 | 9/2002 | Chishti et al. |
| 6,457,972 B1 | 10/2002 | Chishti et al. |
| 6,471,511 B1 | 10/2002 | Chishti et al. |
| 6,482,298 B1 | 11/2002 | Bhatnagar |
| 6,524,101 B1 * | 2/2003 | Phan ................. A61C 7/00 433/24 |
| 6,554,611 B2 | 4/2003 | Shishti et al. |
| 6,572,372 B1 * | 6/2003 | Phan ................. A61C 7/00 433/18 |
| 6,629,840 B2 | 10/2003 | Chishti et al. |
| 6,705,863 B2 | 3/2004 | Phan et al. |
| 6,722,880 B2 | 4/2004 | Chishti et al. |
| 7,481,121 B1 | 1/2009 | Cao |
| 8,899,977 B2 | 12/2014 | Cao et al. |

(56) References Cited

U.S. PATENT DOCUMENTS

| | | | |
|---|---|---|---|
| 9,655,691 | B2 | 5/2017 | Li et al. |
| 2001/0006770 | A1 | 7/2001 | Chishti et al. |
| 2002/0006597 | A1 | 1/2002 | Andreiko et al. |
| 2002/0064746 | A1 | 5/2002 | Muhammad et al. |
| 2003/0009252 | A1 | 1/2003 | Pavlovskaia et al. |
| 2003/0139834 | A1 | 7/2003 | Nikolskiy et al. |
| 2003/0190575 | A1 | 10/2003 | Hilliard |
| 2003/0198912 | A1* | 10/2003 | Mah ............... A61C 7/08 433/6 |
| 2003/0224311 | A1 | 12/2003 | Cronauer |
| 2004/0009449 | A1 | 1/2004 | Mah et al. |
| 2004/0128010 | A1 | 7/2004 | Pavlovskaia et al. |
| 2005/0026102 | A1* | 2/2005 | Miller ............... G16H 10/60 433/24 |
| 2005/0055118 | A1 | 3/2005 | Nikolskiy et al. |
| 2005/0106525 | A1* | 5/2005 | Knopp ............... B33Y 80/00 433/6 |
| 2005/0233276 | A1* | 10/2005 | Kopelman ............ A61C 7/146 433/3 |
| 2006/0177789 | A1* | 8/2006 | O'Bryan ............... A61C 7/08 433/6 |
| 2006/0223022 | A1* | 10/2006 | Solomon ............... A61C 7/08 433/6 |
| 2008/0233529 | A1* | 9/2008 | Kuo ............... A61C 7/08 433/6 |
| 2008/0268400 | A1 | 10/2008 | Moss et al. |
| 2009/0081604 | A1 | 3/2009 | Fisher |
| 2009/0098500 | A1 | 4/2009 | Diaz Rendon |
| 2009/0191502 | A1* | 7/2009 | Cao ............... A61C 7/08 433/24 |
| 2010/0015565 | A1* | 1/2010 | Carrillo Gonzalez ... A61C 5/00 433/7 |
| 2010/0068671 | A1* | 3/2010 | Kakavand ............... A61C 7/08 433/6 |
| 2010/0138025 | A1* | 6/2010 | Morton ............... G06F 30/00 700/104 |
| 2011/0269092 | A1 | 11/2011 | Kuo et al. |
| 2013/0029285 | A1* | 1/2013 | Teasdale ............... A61C 7/08 433/6 |
| 2013/0122447 | A1 | 5/2013 | Lemchen |
| 2013/0204583 | A1 | 8/2013 | Matov et al. |
| 2013/0230818 | A1 | 9/2013 | Matov et al. |
| 2013/0302742 | A1 | 11/2013 | Li et al. |
| 2014/0120490 | A1 | 5/2014 | Borovinskih et al. |
| 2014/0363779 | A1* | 12/2014 | Kopelman ............ A61C 7/08 433/6 |
| 2015/0216627 | A1* | 8/2015 | Kopelman ............ A61C 7/14 433/6 |
| 2015/0238280 | A1* | 8/2015 | Wu ............... A61C 7/08 433/6 |
| 2015/0257856 | A1* | 9/2015 | Martz ............... A61C 7/08 433/6 |
| 2016/0128803 | A1 | 5/2016 | Webber et al. |
| 2016/0193014 | A1 | 7/2016 | Morton et al. |
| 2017/0007365 | A1 | 1/2017 | Kopelman et al. |
| 2017/0258555 | A1 | 9/2017 | Kopelman |
| 2017/0273760 | A1 | 9/2017 | Morton et al. |
| 2017/0367791 | A1 | 12/2017 | Raby et al. |

FOREIGN PATENT DOCUMENTS

| | | |
|---|---|---|
| AU | 5598894 A | 6/1994 |
| CA | 1121955 A | 4/1982 |
| CN | 101188981 A | 5/2008 |
| CN | 201668522 U | 12/2010 |
| CN | 102688102 A | 9/2012 |
| CN | 104144655 A | 11/2014 |
| CN | 104161596 A | 11/2014 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| EP | 2138124 A1 | 12/2009 |
| EP | 2745799 A2 | 6/2014 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | 08508174 | 9/1996 |
| JP | H08508174 A | 9/1996 |
| JP | 2005161081 A | 6/2005 |
| JP | 2011510745 A | 4/2011 |
| KR | 20040004484 A | 1/2004 |
| KR | 200460320 Y1 | 5/2012 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |
| WO | WO-0041643 A1 | 7/2000 |
| WO | WO-0180762 A2 | 11/2001 |
| WO | WO-0180764 A1 | 11/2001 |
| WO | WO-2008115654 A1 | 9/2008 |

OTHER PUBLICATIONS

Alcaniz, et aL., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriott, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6):953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapters, pp. 13-24 (1989).

Bartels, et al., An Introduction to Splines for Use in Computer Graphics and Geometric Modeling, Morgan Kaufmann Publishers, pp. 422-425 (1987).

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.

Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).

Baumrind, "Integrated Three-Dimensional Craniofacial Mapping: Background, Principles, and Perspectives," Semin. in Orthod., 7(4):223-232 (Dec. 2001).

(56) References Cited

OTHER PUBLICATIONS

Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL< http://astronomy.swin.edu.au/-pbourke/prolection/coords>.
Boyd et al., "Three Dimensional Diagnosis and Orthodontic Treatment of Complex Malocclusions With the Invisalipn Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at<http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision, "Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).

Cutting et al., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.
Definition for gingiva. Dictionary.com p. 1-3. Retrieved from the internet Nov. 5, 2004<http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
Dent-X posted on Sep. 24, 1998 at< http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et al., "Automated Finite Element Modeling of a Human Mandible with Dental Implants," JS WSCG '98—Conference Program, retrieved from the Internets http://wscg.zcu.cz/wscg98/papers98/Strasser 98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
Gim-Alldent Deutschland, "Das DUX System: Die Technik," 2 pages total (2002).
Gottleib et al., "JCO Interviews Dr. James A. McNamura, Jr., on the Frankel Appliance: Part 2: Clinical 1-1 Management," J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates In Orthodontics and Orthognathic Surgery," JCO, pp. 262-28 (Apr. 1989).
Heaven et a/., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).

(56) References Cited

OTHER PUBLICATIONS

Hoffmann, et al., "Role of Cephalometry for Planning of Jaw Orthopedics and Jaw Surgery Procedures," (Article Summary in English, article in German), Informatbnen, pp. 375-396 (Mar. 1991).

Hojjatie et al., "Three-Dimensional Finite Element Analysis of Glass-Ceramic Dental Crowns," J. Biomech., 23(11):1157-1166 (1990).

Huckins, "CAD-CAM Generated Mandibular Model Prototype from MRI Data," AAOMS, p. 96 (1999).

Important Tip About Wearing the Red White & Blue Active Clear Retainer System, Allesee Orthodontic Appliances-Pro Lab, 1 page 1998).

International search report and written opinion dated Mar. 18, 2016 for PCT/IB2016/000005.

JCO Interviews, Craig Andreiko, DDS, MS on the Elan and Orthos Systems, JCO, pp. 459-468 (Aug. 1994).

JCO Interviews, Dr. Homer W. Phillips on Computers in Orthodontic Practice, Part 2, JCO. 1997; 1983:819-831.

Jerrold, "The Problem, Electronic Data Transmission and the Law," AJO-DO, pp. 478-479 (Apr. 1988).

Jones et al., "An Assessment of the Fit of a Parabolic Curve to Pre- and Post-Treatment Dental Arches," Br. J. Orthod., 16:85-93 (1989).

JP Faber et al., "Computerized Interactive Orthodontic Treatment Planning," Am. J. Orthod., 73(1):36-46 (Jan. 1978).

Kamada et.al., Case Reports On Tooth Positioners Using LTV Vinyl Silicone Rubber, J. Nihon University School of Dentistry (1984) 26(1): 11-29.

Kamada et.al., Construction of Tooth Positioners with LTV Vinyl Silicone Rubber and Some Case KJ Reports, J. Nihon University School of Dentistry (1982) 24(1):1-27.

Kanazawa et al., "Three-Dimensional Measurements of the Occlusal Surfaces of Upper Molars in a Dutch Population," J. Dent Res., 63(11):1298-1301 (Nov. 1984).

Kawamura, et al. Effect of bending angles in orthodontic retraction springs made from a titanium molybdenum alloy wire: A finite element analysis. The Journal of Japanese Society for Dental Materials and Devices. 2013, vol. 32, Issue 1, pp. 59-66.

Kesling, Coordinating the Predetermined Pattern and Tooth Positioner with Conventional Treatment, KN Am. J. Orthod. Oral Surg. (1946) 32:285-293.

Kesling et al., The Philosophy of the Tooth Positioning Appliance, American Journal of Orthodontics and Oral surgery. 1945; 31:297-304.

Kleeman et al., The Speed Positioner, J. Clin. Orthod. (1996) 30:673-680.

Kochanek, "Interpolating Splines with Local Tension, Continuity and Bias Control," Computer Graphics, ri 18(3):33-41 (Jul. 1984).

KM Oral Surgery (1945) 31 :297-30.

Kunii et al., "Articulation Simulation for an Intelligent Dental Care System," Displays 15:181-188 (1994).

Kuroda et al., Three-Dimensional Dental Cast Analyzing System Using Laser Scanning, Am. J. Orthod. Dentofac. Orthop. (1996) 110:365-369.

Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.

Leinfelder, et al., "A New Method for Generating Ceramic Restorations: a CAD-CAM System," J. Am. 1-1 Dent. Assoc., 118(6):703-707 (Jun. 1989).

Manetti, et al., "Computer-Aided Cefalometry and New Mechanics in Orthodontics," (Article Summary in English, article in German), Fortschr Kieferorthop. 44, 370-376 (Nr. 5), 1983.

McCann, "Inside the ADA," J. Amer. Dent. Assoc., 118:286-294 (Mar. 1989).

McNamara et al., "Invisible Retainers," J. Cfin. Orthod., pp. 570-578 (Aug. 1985).

McNamara et al., Orthodontic and Orthopedic Treatment in the Mixed Dentition, Needham Press, pp. 347-353 (Jan. 1993).

Moermann et al., "Computer Machined Adhesive Porcelain Inlays: Margin Adaptation after Fatigue Stress," IADR Abstract 339, J. Dent. Res., 66(a):763 (1987).

Moles, "Correcting Mild Malalignments—As Easy As One, Two, Three," AOA/Pro Corner, vol. 11, No. 1, 2 pages (2002).

Mormann et al., "Marginale Adaptation von adhasuven Porzellaninlays in vitro," Separatdruck aus: Schweiz. Mschr. Zahnmed. 95: 1118-1129, 1985.

Nahoum, "The Vacuum Formed Dental Contour Appliance," N. Y. State Dent. J., 30(9):385-390 (Nov. 1964).

Nash, "CEREC CAD/CAM Inlays: Aesthetics and Durability in a Single Appointment," Dent. Today, 9(8):20, 22-23 (Oct. 1990).

Nishiyama et al., "A New Construction of Tooth Repositioner by LTV Vinyl Silicone Rubber," J. Nihon Univ. Sch. Dent., 19(2):93-102 (1977).

Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.

Pinkham, "Foolish Concept Propels Technology," Dentist, 3 pages total, Jan./Feb. 1989.

Pinkham, "Inventor's CAD/CAM May Transform Dentistry," Dentist, 3 pages total, Sep. 1990.

Ponitz, "Invisible Retainers," Am. J. Orthod., 59(3):266-272 (Mar. 1971).

Procera Research Projects, "Procera Research Projects 1993—Abstract Collection," pp. 3-7; 28 (1993).

Proffit et al., Contemporary Orthodontics, (Second Ed.), Chapter 15, Mosby Inc., pp. 470-533 (Oct. 1993.

Raintree Essix & ARS Materials, Inc., Raintree Essix, Technical Magazine Table of contents and Essix Appliances,< http:// www.essix.com/magazine/defaulthtml> Aug. 13, 1997.

Redmond et al., "Clinical Implications of Digital Orthodontics," Am. J. Orthod. Dentofacial Orthop., 117(2):240-242 (2000).

Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).

Rekow, "CAD/CAM in Dentistry: A Historical Perspective and View of the Future," J. Can. Dent. Assoc., 58(4):283, 287-288 (Apr. 1992).

Rekow, "Computer-Aided Design and Manufacturing in Dentistry: A Review of the State of the Art," J. Prosthet. Dent., 58(4):512-516 (Oct. 1987).

Rekow, "Dental CAD-CAM Systems: What is the State of the Art?", J. Amer. Dent. Assoc., 122:43-48 1991.

Rekow et al., "CAD/CAM for Dental Restorations—Some of the Curious Challenges," IEEE Trans. Biomed. Eng., 38(4):314-318 (Apr. 1991).

Rekow et al., "Comparison of Three Data Acquisition Techniques for 3-D Tooth Surface Mapping," Annual International Conference of the IEEE Engineering in Medicine and Biology Society, 13(1):344-345 1991.

Rekow, "Feasibility of an Automated System for Production of Dental Restorations, Ph.D. Thesis," Univ. of Minnesota, 244 pages total, Nov. 1988.

Richmond et al., "The Development of a 3D Cast Analysis System," Br. J. Orthod., 13(1):53-54 (Jan. 1986).

Richmond et al., "The Development of the PAR Index (Peer Assessment Rating): Reliability and Validity," Eur. J. Orthod., 14:125-139 (1992).

Richmond, "Recording The Dental Cast In Three Dimensions," Am. J. Orthod. Dentofacial Orthop., 92(3):199-206 (Sep. 1987).

Rudge, "Dental Arch Analysis: Arch Form, A Review of the Literature," Eur. J. Orthod., 3(4):279-284 1981.

Sakuda et al., "Integrated Information-Processing System In Clinical Orthodontics: An Approach with Use of a Computer Network System," Am. J. Orthod. Dentofacial Orthop., 101(3): 210-220 (Mar. 1992).

(56) References Cited

OTHER PUBLICATIONS

Schellhas et al., "Three-Dimensional Computed Tomography in Maxillofacial Surgical Planning," Arch. Otolamp!. Head Neck Sur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in derZahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee HI Orthodontic Appliances-Pro Lab product information for doctors. http://ormco.com/aoa/appliancesservices/RWB/doctorhtml>, 5 pages (May 19, 2003).
The Choice Is Clear: Red, White & Blue . . . The Simple, Affordable, No. Braces Treatment, Allesee HJ Orthodontic Appliances-Pro Lab product information for patients,<http://ormco.com/aoa/appliancesservices/RWB/patients.html>, 2 pages (May 19, 2003).
The Choice Is Clear: Red, White & Blue . . . The Simple, Affordable, No-Braces Treatment, Allesee Orthodontic Appliances-Pro Lab product information, 6 pages (2003).
The Red, White & Blue Way to Improve Your Smile!Allesee Orthodontic Appliances-Pro Lab product information for patients, 2 pages 1992.
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering Of Geometric Models—An Introduction," Computer-Aided Design, 29(4):255-268,1997.

Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987.
Wishan, "New Advances in Personal Computer Applications for Cephalometric Analysis, Growth Prediction, Surgical Treatment Planning and Imaging Processing," Symposium: Computerized Facial Imaging in Oral and Maxiiofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be A Candidate For This Invisible No. Braces Treatment, Allesee Orthodontic Appliances-Pro Lab product information for patients, 2 pages (2002).
National Council of Dental Hygienists Education, I, Basic Knowledge on Orthodontic Treatment, 3 Modes of Tooth Movement, Masticatory Disorders and Occlusal Abnormality 2 Orthodontics, 1st Edition, 6th Printing, Japan, Medical and Dental Publishing Company, Feb. 20, 2014, pp. 58-59.

* cited by examiner

METHOD TO MODIFY ALIGNER BY MODIFYING TOOTH POSITION

CROSS-REFERENCE

This application is a continuation application of U.S. application Ser. No. 14/985,904, filed Dec. 31, 2015, which claims the benefit of U.S. Provisional Application No. 62/099,965, filed Jan. 5, 2015, each of which are incorporated herein by reference in their entirety.

BACKGROUND

Prior methods and apparatus for aligning teeth can be less than ideal in at least some instances. While braces can be used to move teeth into alignment, braces can be cumbersome to wear and can require expertise to place on the subject. Also, complex movements can be difficult to achieve and orthodontic placement may less than ideally address the complex movements of several teeth in at least some instances.

Transparent shell appliances have been used to successfully move teeth. For example a user can be provided with a series of transparent shell appliances. Each shell of the series of shells may correspond to a stage of the treatment. For example, a fourth shell in a series of ten shells may correspond to the fourth state of treatment. Although transparent shell appliances can be used to successfully reposition teeth, the transparent shell appliances can provide less than ideal results in at least some instances. For example, complex movements of teeth, such as to fill an extraction, can be difficult to treat with transparent shell appliances. Also, in at least some instances, a wearer of a transparent shell appliance may not complete treatment, for example when teeth do not move sufficiently with the appliance and the user stops treatment.

Prior methods and apparatus of aligning teeth with transparent shell appliances can rely on providing shells with cavities shaped to the tooth profile at a final intended position and orientation at a stage of the treatment. Work in relation to embodiments suggests cavities shaped to position a tooth at a final intended position and orientation at a stage of the treatment can provide less than ideal movement. Although attachments can be placed on teeth to facilitate movement of the teeth with polymeric shell appliances, the resulting movements can be less than ideal in at least some instances. For example, the force applied to the tooth can decrease as the tooth moves toward the target position. Also, the movement of a tooth may not be uniform, and the tooth may move more easily along some dimensions than others. For example, the movement of a tooth can occur along six degrees of freedom, and relative movement compared to a target movement can differ among the degrees of freedom of the tooth. Further the movement of teeth can be coupled, such that movement of a first tooth can affect movement adjacent teeth.

Prior user interface software can provide the user with teeth shown at target positions for each stage of treatment. The polymeric shell appliance can be manufactured in accordance with target positions of the teeth. Although manufacturing appliances in accordance with target positions of the teeth at the end of each stage of treatment can be effective, work in relation to some embodiments suggests that the amount of force applied to each tooth can differ from that which would be ideal, and the corresponding movement of the tooth can be less than ideal in at least some instances.

In light of the above, it would be desirable to provide improved methods and apparatus for moving teeth to target positions with polymeric shell appliances. Ideally such methods and apparatus would more accurately move teeth to target positions with decreased forces.

SUMMARY

Embodiments of the present disclosure improved methods and apparatus for moving teeth. In many embodiments, appliances such as polymeric shell appliances are provided in which the appliances are configured to provide one or more activation forces to facilitate tooth movement. In many embodiments, the activation forces provided by each appliance are arranged to provide force in a direction opposite to an intended direction of tooth movement for each of a plurality of teeth, and the tooth movement may comprise a movement vector composed of translations and rotations of the tooth for each of the plurality of teeth. The activation forces may comprise one or more of a force to urge a tooth in target direction of tooth movement, or a counter force opposite the force. In many embodiments, a tooth moves about a center of resistance, and the tooth is urged with the force in the targeted direction of tooth movement so as to generate a moment about the center of resistance. The counter force can generate a counter moment about the center of resistance, such that the tooth can be moved with a differential moment comprising a differential of the moment and the counter moment. The differential moment can be related to tipping of the tooth along the targeted direction of movement, and tipping of the tooth along the targeted direction of movement can be controlled in order to facilitate movement and may decrease an amount of force to move the tooth along the targeted direction for each of the plurality of teeth.

In many embodiments, each polymeric shell appliance comprises a plurality of engagement structures shaped to engage a plurality of attachments to generate a plurality of counter forces and counter moments for a stage of treatment. The polymeric shell appliance may comprise a plurality of tooth receiving cavities with an inner surface profile shaped so as to correspond to a surface profile of a received tooth, in which each of the plurality of tooth receiving cavities is positioned and/or oriented away from a corresponding target position and orientation of the received tooth for the corresponding stage of treatment.

In many embodiments, a processor comprises a user input and display for a user to position and orient a plurality of teeth at target positions and orientations for each stage of a treatment. The processor may comprise instructions to position teeth receiving cavities of the appliance at positions away from the target positions and orientations for each stage of the treatment in order to provide activation energy to the appliance. The processor may comprise instructions to manufacture a plurality of appliances with indirect manufacturing comprising thermoforming or direct manufacturing comprising one or more of 3D printing, stereolithography, or fused deposition modeling.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

Figure 1A:
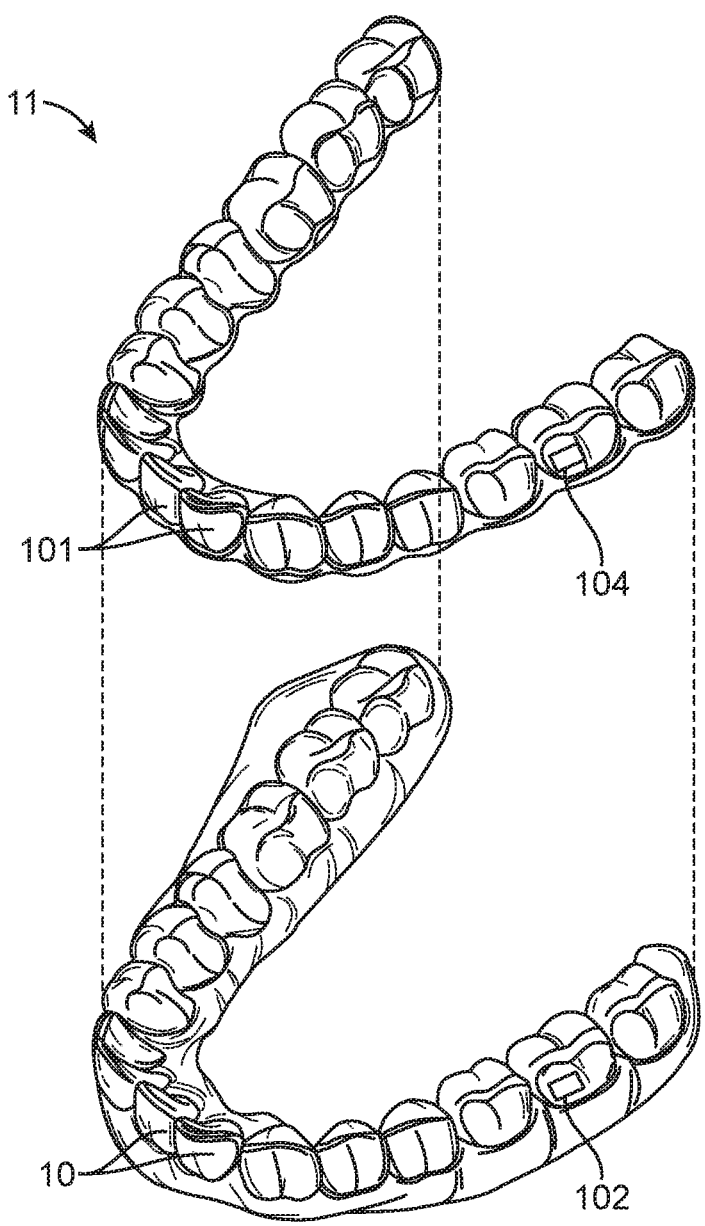
FIG. 1A shows a jaw, a plurality of teeth, and a polymeric shell appliance to align teeth, in accordance with embodiments.

As used herein the terms "torque" and "moment" are treated synonymously.

As used herein the term "and/or" is used as a functional word to indicate that two words or expressions are to be taken together or individually. For example, A and/or B encompasses A alone, B alone, and A and B together.

As used herein a "plurality of teeth" encompasses two or more teeth.

As used herein a "moment" encompasses a force acting on an object such as a tooth at a distance from a center of resistance. The moment may be calculated with a vector cross product of a vector force applied to a location corresponding to a displacement vector from the center of resistance, for example. The moment may comprise a vector pointing in a direction. A moment opposing another moment may encompass one of the moment vectors oriented toward a first side of the object such as the tooth and the other moment vector oriented toward an opposite side of the object such as the tooth, for example.

As used herein a "differential moment" encompasses two or more moments coupled to each other to provide opposing moments to one or more teeth. The differential moment may comprise a first moment and a second opposing moment applied to a tooth. Alternatively or in combination, the differential moment may comprise a first moment of a first one or more teeth of the arch coupled to a second, opposing moment of a second one or more teeth of the arch. The first one or more teeth of the arch may comprise a first segment of the arch and the second one or more teeth of the arch may comprise a second segment of the arch, in which the first moment of the first segment of the arch is coupled to the second, opposing moment of the second segment of the arch. The first one or more teeth may comprise a first plurality of adjacent teeth of the first segment of the arch, and the second one or more teeth may comprise a second plurality of adjacent teeth of the second segment of the arch, in which the first moment of the first plurality of adjacent teeth of the arch opposes the second, counter moment of the second plurality of adjacent teeth of the arch.

As used herein, a tooth comprising a moment refers to a tooth with a force acting on the tooth about a center of resistance. The force can be generated by an appliance coupled to the tooth, either directly or with an attachment on the tooth, and combinations thereof.

The counter moments as disclosed herein can be used to accurately control movement of one or more teeth, and can be used to provide anchoring of one or more teeth. In many embodiments, a plurality of posterior teeth comprises counter moments to improve anchoring of the posterior teeth, and one or more anterior teeth comprise a lesser counter moment and are moved toward the plurality of posterior anchor teeth. Alternatively, counter moments of one or more of the plurality of posterior teeth can be configured to allow the one or more posterior teeth to move toward the anterior tooth or teeth.

The moments of a plurality of groups of one or more teeth can be coupled to each other in order to control movement of the teeth, and the moments of the one or more groups of teeth can be coupled to each other in many ways. The moments of the groups of one or more teeth can be coupled to each other with offset moments and/or balanced moments in order to provide preferential movement to one or more of the groups of one or more teeth. For example, posterior teeth can be provided with a larger counter moment than anterior teeth in order to move the anterior teeth to the posterior teeth.

The moments and counter moments as disclosed herein are well suited for moving many types of teeth and conditions of teeth, and are well suited for use with many conditions of teeth. The embodiments disclosed herein can be used to treat one or more of: cant of an occlusal plane, to raise teeth on one side of the mouth and lower teeth on an opposite side of the mouth, en masse expansion of teeth along an arch, closure of an extraction site, intrusion, extrusion, rotation, or tipping, or combinations thereof, for example.

In many embodiments, one or more posterior teeth comprise one or more of a molar, a premolar, or a canine, and one or more anterior teeth comprise one or more of a central incisor, a lateral incisor, a cuspid, a first bicuspid or a second bicuspid. For example, "posterior teeth" may be used herein to refer to the molars and premolars and "anterior teeth" may be used herein to refer to the incisors and canines. It shall be appreciated that "posterior" and "anterior" may also refer to the relative positioning of groups of one or more teeth, e.g., "posterior teeth" may refer to any teeth that are disposed posteriorly relative to one or more "anterior teeth," and "anterior teeth" may refer to any teeth that are disposed anteriorly relative to one or more "posterior teeth."

The embodiments disclosed herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The first group of teeth can be coupled to the second group of teeth in many ways, and in many embodiments the first group of one or more teeth comprises a first moment and a first counter moment, and the second group of one or more teeth comprises a second moment and a second counter moment. The first moment and the first counter moment may comprise a combined first moment and a combined first counter moment of the first group of one or more teeth, and the second moment and the second counter moment may comprise a combined second moment and a combined second counter moment of the second group of teeth. The combined first moment, combined first counter moment, combined second moment and combined second counter moment can be coupled to each other with the polymeric shell appliance in order to move the first group of one or more teeth, the second group of one or more teeth, or combinations thereof.

In many embodiments, each of the first group of one or more teeth comprises a first moment and a counter moment, and each of the second group of one or more teeth comprises a second moment and a second counter moment. The first moment can be generated with a first force to one or more of the first teeth at a first region or location of the first tooth and the counter moment generated with a counter force to the one of the first teeth at a counter location. The second moment can be generated with a second force to one or more of the second teeth at a region of the second tooth and the counter moment generated with a counter force to the one of the second teeth at a counter location.

The center of resistance of an individual tooth can be located near the bifurcation or trifurcation of the root of the tooth, for example. For a single rooted tooth, the center of resistance can be located somewhere between about 25% and about 70% of the distance from the alveolar crest to the apex of the root, for example about 40% of the distance.

The center of resistance of a group of a segment of teeth comprising a plurality of teeth can be determined in one or more of many ways. The center of resistance can be determined with finite element modeling, published values in the scientific literature, bench testing with experimental loads, mathematical formula and approximations, and/or combinations thereof, for example. The center of resistance can be determined in response to supporting dental structures such as the periodontal ligaments, soft tissue, and bony supporting structures, for example. Although the center of resistance of a group of teeth may change with the direction of movement, a person of ordinary skill in the art can determine the center of resistance in accordance with embodiments disclosed herein.

The embodiments disclosed herein are well suited for moving one or more teeth of the first group of one or more teeth or moving one or more teeth of the second group of one or more teeth, or combinations thereof.

The embodiments disclosed herein are well suited for combination with one or known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translational. Embodiments disclosed herein can provide differential moment vectors based on a moment and a counter moment to each of a plurality of teeth. The differential moment vector can provide improved accuracy of movement of the teeth and may result in decreased amounts of force to move one or more teeth.

The present disclosure provides orthodontic systems and related methods for designing and providing improved or more effective tooth moving systems for eliciting a desired tooth movement and/or repositioning teeth into a desired arrangement.

In one aspect, a method of moving a plurality of teeth with an appliance is provided. The method comprises: providing an appliance shaped for placement on the plurality of teeth, the appliance comprising a plurality of tooth receiving cavities shaped to receive each of the plurality of teeth and provide a differential moment to the plurality of teeth in order to move and/or anchor the teeth, the plurality of teeth comprising a first one or more teeth and a second one or more teeth, the first one or more teeth comprising a first counter moment and the second one or more teeth comprising a second counter moment, the first counter moment opposite the second counter moment.

In many embodiments, the differential moment of said each of the plurality of teeth comprises a moment and a counter moment opposite the moment, the moment generated with a force about a center of resistance, the counter moment generated with a counter force about the center of resistance, the counter force opposite the force, the force greater than the counter force for said each of the plurality of teeth in order to move the teeth.

In many embodiments, each of the plurality of tooth receiving cavities is shaped and arranged to produce a summed moment comprising a sum of the moment and the counter moment for said each of the plurality of teeth.

In many embodiments, the appliance is shaped to urge a first portion of the first one or more teeth and a second portion of the second one or more teeth away from each other in order to move the first one or more teeth toward the second one or more teeth. The appliance can be shaped to urge a first portion of the first one or more teeth and a second portion of the second one or more teeth away from each other in order to move the first one or more teeth and the second one or more teeth toward each other.

In many embodiments, the first one or more teeth comprise a first plurality of teeth and the appliance comprises a shape to generate the first counter moment with each of the first plurality of adjacent teeth, the first counter moment comprising a combination of similarly oriented moments from said each of the first plurality of adjacent teeth.

In many embodiments, the second one or more teeth comprise a second plurality of teeth and the appliance comprises a shape to generate the second counter moment with each of the second plurality of adjacent teeth, the second counter moment comprising a combination of similarly oriented moments from said each of the second plurality of adjacent teeth.

In many embodiments, the plurality of tooth receiving cavities is shaped and arranged to balance the differential moment between the first one or more teeth and the second one or more teeth and to balance the first counter moment and the second counter moment between the first one or more teeth and the second one or more teeth.

In many embodiments, the first one or more teeth comprises an anterior group of one or more teeth and the second one or more teeth comprises a posterior group of one or more teeth, wherein the first counter moment of the anterior group of one or more teeth opposes the second counter moment of the posterior group of one or more teeth. The anterior group of one or more teeth can comprise a single anterior tooth, the appliance shaped to generate the first counter moment with the single anterior tooth. The posterior group of one or more teeth can comprise a plurality of adjacent posterior teeth, the appliance shaped to generate the second counter moment with the plurality of adjacent posterior teeth. The appliance can be shaped to generate the second counter moment with each of the plurality of adjacent posterior teeth, the second counter moment comprising a combination of similarly oriented moments from said each of the adjacent posterior teeth. The first counter moment can be less than the second counter moment in order to move the anterior group of one or more teeth toward the plurality of adjacent posterior teeth. The plurality of adjacent posterior teeth can comprise three adjacent posterior teeth, the appliance shaped to generate the second counter moment with the three adjacent posterior teeth. The three adjacent posterior teeth can comprise three adjacent posterior anchor teeth coupled together as a block of teeth having a combined center of resistance away from the center of resistance of each tooth of the three adjacent posterior teeth.

In many embodiments, the first one or more teeth comprises a posterior group of one or more teeth and the second one or more teeth comprises an anterior group of teeth, and the first counter moment of the anterior group of one or more teeth opposes the second counter moment of the anterior group of one or more teeth. The group of one or more anterior teeth can comprise a plurality of adjacent anterior teeth and the plurality of adjacent tooth receiving cavities can comprise a plurality of adjacent anterior tooth receiving cavities shaped to generate the first counter moment.

In many embodiments, the method further comprises providing an external force or anchorage producing mechanism coupled to the plurality of teeth, wherein the external force or anchorage producing mechanism is arranged to apply a force and/or anchorage to the posterior group of one or more teeth so as to reduce movement of the posterior group of one or more teeth. The force applied to the posterior group of one or more teeth by the external force producing mechanism can comprise a distal force component. The external force or anchorage producing mechanism can comprise a class II or class III elastic.

In many embodiments, each of the plurality of tooth receiving cavities comprises an inner surface profile corresponding to a surface profile of the tooth in order to generate a moment and a counter moment with said each of the plurality of teeth.

In many embodiments, the plurality of tooth receiving cavities comprises a first one or more cavities shaped to receive the first one or more teeth and a second one or more cavities shaped to receive the second one or more teeth, the first one or more tooth receiving cavities shaped to generate the first counter moment and the second one or more tooth receiving cavities shaped to generate the second counter moment with the first counter moment opposite the second counter moment.

In many embodiments, the first counter moment of the first one or more teeth is sufficient to move first one or more roots of the first one or more teeth toward the second one or more teeth.

In many embodiments, the differential moment to said each of the plurality of teeth comprises a moment and a counter moment opposite the moment, wherein a force at a location generates the moment about a center of resistance and a counter force at a counter location generates the counter moment about the center of resistance for said each of the plurality of teeth and wherein a sum of the force and the counter force comprises a combined overall force to the tooth for said each of the plurality of teeth. A combined overall force of the first one or more teeth can urge the first one or more teeth toward the second one or more teeth. The combined overall force can be lower than each of the force and the counter force for said each of the plurality of teeth in order to move the first one or more teeth toward the second one or more teeth with decreased amounts of force.

In many embodiments, the one or more of the plurality of tooth receiving cavities comprise one or more engagement structures shaped to receive one or more attachments and urge the first one or more teeth away from the second one or more teeth with a counter force in order to facilitate movement of the first one or more teeth toward the second one or more teeth. The one or more engagement structures shaped to receive the one or more attachments can generate a force opposite the counter force to move the first one or more teeth in a target direction toward the second one or more teeth. The force can be greater than the counter force to move the one or more target teeth in the target direction and the counter force can decrease a total amount of force to the one or more target teeth and generate the first counter moment.

In many embodiments, the appliance comprises a plurality of structures shaped to receive a plurality of attachments and urge a first tooth away from a second tooth in order to facilitate movement of the first tooth toward the second tooth.

In many embodiments, the appliance comprises a polymeric shell, the polymeric shell comprising a plurality of activation sites to store energy with a plurality of deflections of the polymeric shell in order to direct movement of the teeth. One or more of the plurality of deflections can store energy with a force against the tooth, the force can be insufficient to move the tooth in a direction opposite the deflection when the tooth comprises a target position and orientation, and additional deflection can generate sufficient increased force to move the tooth in response to the tooth moving away from the target position and orientation. The target position and orientation can comprise a non-extruded position and orientation of the tooth and the force can be oriented in an intrusive direction and insufficient to intrude the tooth and sufficient to inhibit extrusion of the tooth. The target position and orientation can comprise a non-intruded position and orientation of the tooth corresponding to a stage of the appliance and the force can be oriented in an extrusive direction and insufficient to extrude the tooth and sufficient to inhibit intrusion of the tooth.

In many embodiments, the plurality of teeth comprises a plurality of adjacent teeth and a target tooth to be moved toward the plurality of adjacent teeth, the plurality of appliance cavities shaped to receive each of the plurality of adjacent teeth and the target tooth in order to move the target tooth toward the plurality of adjacent teeth, wherein the plurality of cavities is shaped and arranged to provide opposing forces to the plurality of adjacent teeth and the target tooth in order to distribute forces among the plurality of adjacent teeth and inhibit movement. The plurality of adjacent teeth can comprise a plurality of adjacent molars and the target tooth can comprise an anterior tooth retracted toward an extraction site. The target tooth can move in a sagittal direction.

In many embodiments, a user adjusts positions and orientations of the teeth shown on a display with user input for a stage of treatment corresponding to the appliance, wherein each of the plurality of tooth receiving cavities comprises a cavity shape profile corresponding to a tooth shape profile of a tooth to be received in the cavity, and wherein each cavity shape profile is positioned and/or oriented away from a corresponding tooth shape profile position and orientation shown on the display in order to provide activation energy to the appliance when placed on the plurality of teeth.

In many embodiments, each cavity shape matches at least a portion of a surface of the received tooth. For example, each cavity shape can match opposing surfaces of the received tooth in order to engage each of the opposing surfaces of the tooth. Each cavity shape profile can comprise first and second opposing surfaces to engage said each of the opposing surfaces of the tooth, wherein said first and second opposing surfaces are shaped to contact the tooth together along a direction of tooth movement.

In many embodiments, the first one or more teeth and a second one or more teeth move toward each other in order to provide differential space closure to a space extending between the first one or more teeth and the second one or more teeth. The first one or more teeth can comprise a plurality of anterior teeth and the second one or more teeth can comprise a plurality of posterior teeth, and the plurality of posterior teeth can comprise a combined center of resistance away from a center of resistance of each of the plurality of posterior teeth.

In many embodiments, the first counter moment corresponds to a first force to the first one or more teeth from the appliance at a first location about a first center of resistance and the second counter moment corresponds to a second counter force to the second one or more teeth about a second center of resistance.

In many embodiments, the appliance comprises a polymeric shell appliance. The appliance can comprise a polymeric shell appliance directly manufactured with one or more of 3D printing, stereo lithography, or fused deposition modeling.

In many embodiments, the plurality of teeth receiving cavities provide the differential moment to the plurality of teeth in order to increase anchorage of one or more of the plurality of teeth.

In another aspect, an appliance shaped for placement on a plurality of teeth is provided. The appliance comprises a plurality of tooth receiving cavities shaped to receive each of the plurality of teeth and provide a differential moment to the plurality of teeth in order to move and/or anchor one or more teeth of the plurality of teeth, the plurality of tooth receiving cavities comprising a first one or more tooth receiving cavities shaped to receive a first one or more teeth and a second one or more tooth receiving cavities shaped to receive a second one or more teeth, the first one or more tooth receiving cavities shaped to provide a first counter moment to the first one or more teeth, the second one or more tooth receiving cavities shaped to provide a second counter moment to the second one or more teeth, the first counter moment opposite the second counter moment.

In many embodiments, each of the plurality of tooth receiving cavities is shaped and arranged to provide the differential moment comprising a moment and a counter moment opposite the moment to a received tooth, the moment generated with a force about a center of resistance, the counter moment generated with a counter force about the center of resistance, the counter force opposite the force, the force greater than the counter force for said each of the plurality of teeth.

In many embodiments, the first one or more tooth receiving cavities is shaped and arranged to receive one or more anterior teeth and generate the first counter moment and the second one or more tooth receiving cavities is shaped and arranged to receive posterior teeth and generate the second counter moment, the second counter moment greater than the first counter moment.

In many embodiments, each of the plurality of tooth receiving cavities is shaped and arranged to produce a summed moment comprising a sum of the moment and the counter moment for said each of the plurality of teeth.

In many embodiments, the first one or more tooth receiving cavities comprises a plurality of adjacent teeth receiving cavities shaped and arranged to receive a plurality of adjacent teeth, wherein the first counter moment comprises a combined counter moment of the plurality of adjacent teeth about a center of resistance away from a center of resistance of said each of the plurality of adjacent teeth.

In many embodiments, the second one or more tooth receiving cavities comprises a plurality of adjacent teeth receiving cavities shaped and arranged to receive a plurality of adjacent teeth, wherein the second counter moment comprises a combined counter moment of the plurality of adjacent teeth about a center of resistance away from a center of resistance of said each of the plurality of adjacent teeth.

In many embodiments, each of the plurality of tooth receiving cavities comprises a cavity shape profile corresponding to a tooth shape profile of a tooth to be received in the cavity, wherein each cavity shape profile is positioned and/or oriented away from a corresponding tooth shape profile position and orientation in order to provide activation energy to the polymeric shell appliance when placed on the plurality of teeth. Each cavity shape profile can comprise first and second opposing surfaces to engage said each of the opposing surfaces of the tooth and said first and second opposing surfaces can be shaped to contact the tooth together along a direction of tooth movement.

In many embodiments, the polymeric shell appliance is shaped to urge a first portion of the first one or more teeth and a second portion of the second one or more teeth away from each other in order to move the first one or more teeth toward the second one or more teeth. The polymeric shell appliance can be shaped to urge a first portion of the first one or more teeth and a second portion of the second one or more teeth away from each other in order to move the first one or more teeth and the second one or more teeth toward each other. The first one or more teeth can comprise a first plurality of teeth and the polymeric shell appliance can comprise a shape to generate the first counter moment with each of the first plurality of adjacent teeth, the first counter moment comprising a combination of similarly oriented moments from said each of the first plurality of adjacent teeth. The second one or more teeth can comprise a second plurality of teeth and the polymeric shell appliance can comprise a shape to generate the second counter moment with each of the second plurality of adjacent teeth, the second counter moment comprising a combination of similarly oriented moments from said each of the second plurality of adjacent teeth.

In many embodiments, the plurality of tooth receiving cavities is shaped and arranged to balance the differential moment between the first one or more teeth and the second one or more teeth and to balance the first counter moment and the second counter moment between the first one or more teeth and the second one or more teeth. The first one or more teeth can comprise an anterior group of one or more teeth and the second one or more teeth can comprise a posterior group of teeth, wherein the first counter moment of the anterior group of one or more teeth opposes the second counter moment of the posterior group of one or more teeth. The posterior group of one or more teeth can comprise a plurality of adjacent posterior teeth, the polymeric shell appliance being shaped to generate the second counter moment with the plurality of adjacent posterior teeth. The plurality of adjacent posterior teeth can comprise three adjacent posterior teeth, the polymeric shell appliance being shaped to generate the second counter moment with the three adjacent posterior teeth. The three adjacent posterior teeth can comprise three adjacent posterior anchor teeth coupled together as a block of teeth having a combined center of resistance away from the center of resistance of each tooth of the three adjacent posterior teeth. The anterior group of one or more teeth can comprise a single anterior tooth, the polymeric shell appliance being shaped to generate the first counter moment with the single anterior tooth.

In many embodiments, the polymeric shell appliance is shaped to generate the second counter moment with each of the plurality of adjacent posterior teeth, the second counter moment comprising a combination of similarly oriented moments from said each of the adjacent posterior teeth. The first counter moment can be less than the second counter moment in order to move the anterior group of one or more teeth toward the plurality of adjacent posterior teeth.

In many embodiments, the first one or more teeth comprises a posterior group of one or more teeth and the second one or more teeth comprises an anterior group of teeth, wherein the first counter moment of the anterior group of one or more teeth opposes the second counter moment of the anterior group of one or more teeth. The group of one or more anterior teeth can comprise a plurality of adjacent anterior teeth and the plurality of adjacent tooth receiving cavities can comprise a plurality of adjacent anterior tooth receiving cavities shaped to generate the first counter moment.

In many embodiments, the appliances further comprises an external force or anchorage producing mechanism coupled to the plurality of teeth, wherein the external force or anchorage producing mechanism is arranged to apply a force and/or anchorage to the posterior group of one or more teeth so as to reduce movement of the posterior group of one or more teeth. The force applied to the posterior group of one or more teeth by the external force producing mechanism can comprise a distal force component. The external force or anchorage producing mechanism can comprise a class II or class III elastic.

In many embodiments, each of the plurality of tooth receiving cavities comprises an inner surface profile corresponding to a surface profile of the tooth in order to generate a moment and a counter moment with said each of the plurality of teeth.

In many embodiments, the plurality of tooth receiving cavities comprises a first one or more cavities shaped to receive a first one or more teeth and a second one or more cavities shaped to receive a second one or more teeth, the first one or more tooth receiving cavities shaped to generate the first counter moment and the second one or more tooth receiving cavities shaped to generate the second counter moment with the first counter moment opposite the second counter moment.

In many embodiments, the first counter moment of the first one or more teeth is sufficient to move first one or more roots of the first one or more teeth toward the second one or more teeth.

In many embodiments, the differential moment to said each of the plurality of teeth comprises a moment and a counter moment opposite the moment, wherein a force at a location generates the moment about a center of resistance and a counter force at a counter location generates the counter moment about the center of resistance for said each of the plurality of teeth and wherein a sum of the force and the counter force comprises a combined overall force to the tooth for said each of the plurality of teeth. A combined overall force of the first one or more teeth can urge the first one or more teeth toward the second one or more teeth. The combined overall force can be lower than each of the force and the counter force for said each of the plurality of teeth in order to move the first one or more teeth toward the second one or more teeth with decreased amounts of force.

In many embodiments, one or more of the plurality of tooth receiving cavities comprises one or more engagement structures shaped to receive one or more attachments and urge the first one or more teeth away from the second one or more teeth with a counter force in order to facilitate movement of the first one or more teeth toward the second one or more teeth. The one or more engagement structures shaped to receive the one or more attachments can generate a force opposite the counter force to move the first one or more teeth in a target direction toward the second one or more teeth, and the force can be greater than the counter force to move the one or more target teeth in the target direction, and the counter force can decrease a total amount of force to the one or more target teeth and generates the first counter moment. In many embodiments, the appliance further comprises the one or more attachments.

In many embodiments, the polymeric shell appliance comprises a plurality of engagement structures shaped to receive a plurality of attachments and urge a first tooth away from a second tooth in order to facilitate movement of the first tooth toward the second tooth. In many embodiments, the appliance further comprises the plurality of attachments.

In many embodiments, the appliance comprises a polymeric shell, the polymeric shell comprising a plurality of activation sites to store energy with a plurality of deflections of the polymeric shell in order to direct movement of the teeth. One or more of the plurality of deflections can store energy with a force against the tooth, wherein the force is insufficient to move the tooth in a direction opposite the deflection when the tooth comprises a target position and orientation corresponding to a stage of the polymeric shell, and wherein additional deflection generates sufficient increased force to move the tooth in response to the tooth moving away from the target position and orientation. The target position and orientation can comprise a non-extruded position and orientation of the tooth and the force can be oriented in an intrusive direction and insufficient to intrude the tooth and sufficient to inhibit extrusion of the tooth. The target position and orientation can comprise a non-intruded position and orientation of the tooth and the force can be oriented in an extrusive direction and insufficient to extrude the tooth and sufficient to inhibit intrusion of the tooth.

In many embodiments, the plurality of teeth comprises a plurality of adjacent teeth and a target tooth to be moved toward the plurality of adjacent teeth, the plurality of polymeric shell appliance cavities shaped to receive each of the plurality of adjacent teeth and the target tooth in order to move the target tooth toward the plurality of adjacent teeth and wherein the plurality of cavities is shaped and arranged to provide opposing forces to the plurality of adjacent teeth and the target tooth in order to distribute forces among the plurality of adjacent teeth and inhibit movement. The plurality of adjacent teeth can comprise a plurality of adjacent molars and the target tooth can comprise an anterior tooth retracted toward an extraction site. The target tooth can move in a sagittal direction.

In many embodiments, a user adjusts positions and orientations of the teeth shown on a display with user input for a stage of treatment corresponding to the polymeric shell appliance, wherein each of the plurality of tooth receiving cavities comprises a cavity shape profile corresponding to a tooth shape profile of a tooth to be received in the cavity, and wherein each cavity shape profile is positioned and/or oriented away from a corresponding tooth shape profile position and orientation shown on the display in order to provide activation energy to the polymeric shell appliance when placed on the plurality of teeth. Each cavity shape profile can match opposing surfaces of the received tooth in order to engage each of the opposing surfaces of the tooth. Each cavity shape profile can comprise first and second opposing surfaces to engage said each of the opposing surfaces of the tooth and said first and second opposing surfaces can be shaped to contact the tooth together along a direction of tooth movement.

In many embodiments, the appliance is configured to move the first one or more teeth and the second one or more teeth toward each other in order to provide differential space closure to a space extending between the first one or more teeth and the second one or more teeth. The first one or more teeth can comprise a plurality of anterior teeth and the second one or more teeth can comprise posterior teeth and the plurality of posterior teeth can comprise a combined center of resistance away from a center of resistance of each of the plurality of posterior teeth.

In many embodiments, the first counter moment corresponds to a first force to the first one or more teeth from the appliance at a first location about a first center of resistance and the second counter moment corresponds to a second counter force to the second one or more teeth about a second center of resistance.

In many embodiments, the appliance comprises a polymeric shell appliance. The appliance can comprise a polymeric shell appliance directly manufactured with one or more of 3D printing, stereo lithography, or fused deposition modeling.

In many embodiments, the plurality of teeth receiving cavities provide the differential moment to the plurality of teeth in order to increase anchorage of one or more of the plurality of teeth.

In another aspect, a system to generate a plurality of appliances for moving a plurality of teeth of a subject is provided. The system comprises: an input; a display; and a processor coupled to the display and the input. The processor can comprise instructions embodied on a tangible medium to: display the plurality of teeth of the subject at a plurality of stages of a treatment, each stage corresponding to an appliance of the plurality of appliances, adjust each of the plurality of teeth on the display to a position and an orientation in response to user input to position the teeth at each of a plurality of stages of the treatment, and determine a shape profile of a polymeric shell appliance shaped for placement on the plurality of teeth at a corresponding stage of treatment, the polymeric shell appliance comprising a plurality of tooth receiving cavities, each of the plurality of tooth receiving cavities comprising a shape profile corresponding to a shape profile of a received tooth, wherein the shape profile of said each of the plurality of tooth receiving cavities is one or more of located or oriented away from the position and orientation shown on the display for the corresponding stage of treatment.

In many embodiments, the processor comprises instructions to include an attachment on one or more of the plurality of teeth in response to a force to the one or more of the plurality of teeth.

In many embodiments, the processor comprises instructions to generate one or more attachment engaging structures on the polymeric shell appliance.

In many embodiments, the shape profile of said each of the plurality of tooth receiving cavities matches the shape profile of the received tooth. The shape profile of said each of the plurality of tooth receiving cavities can be configured to engage opposing surfaces of the received tooth. Each cavity shape profile can comprise first and second opposing surfaces to engage said each of the opposing surfaces of the received tooth and said first and second opposing surfaces can be shaped to contact the tooth together along a direction of tooth movement.

In many embodiments, the processor comprises instructions to determine a center of resistance of each of a plurality of individual teeth, wherein the processor comprises instructions to determine a center of resistance of a group of adjacent teeth, in which the center of resistance of the group of adjacent teeth is located away from a center of resistance of each of the group of adjacent teeth.

In many embodiments, the processor comprises instructions to determine a differential moment about a center of resistance for each of the plurality of teeth. The differential moment can comprise a first moment about the center of resistance in response to a first force and a second moment about the center of resistance in response to a second force opposite the first force for said each of the plurality of teeth. The differential moment can be related to tipping along a direction of tooth movement for said each of the plurality of teeth.

In many embodiments, the processor comprises instructions to generate an appliance as in any one of the embodiments herein.

In another aspect, a method of moving teeth with a polymeric shell appliance is provided. The method comprises: providing a first force to a first crown of a first tooth and a second force to a second crown of a second tooth in order to move the first tooth toward the second tooth, the force resulting in a first moment on the first tooth and a second moment on the second tooth; and providing a first counter force to the first crown opposite the first force and a second counter force to the second crown opposite the second force in order to inhibit the first moment in the first tooth and the second moment in the second tooth, the first force greater than the first counter force and the second force greater than the second counter force in order to move one or more of the first tooth toward the second tooth or the second tooth toward the first tooth.

In another aspect, a method comprises providing a polymeric shell appliance. The polymeric shell appliance is configured to provide: a first force to a first crown of a first tooth and a second force to a second crown of a second tooth in order to move the first tooth toward the second tooth, the force resulting in a first moment on the first tooth and a second moment on the second tooth; and a first counter force to the first crown opposite the first force and a second counter force to the second crown opposite the second force in order to inhibit the first moment in the first tooth and the second moment in the second tooth, the first force greater than the first counter force and the second force greater than the second counter force in order to move one or more of the first tooth toward the second tooth or the second tooth toward the first tooth.

In many embodiments, the polymeric shell appliance is configured to couple the first force to the first crown and the second force to the second crown with the polymeric shell extending between the first crown and the second crown and the polymeric shell appliance is configured to provide the first counter force to the first crown with a first attachment on the first crown engaging the polymeric shell appliance and to provide the second counter force to the second crown with a second attachment on the second crown engaging the polymeric shell.

In many embodiments, the polymeric shell appliance is shaped to engage the first crown at a first location to generate the first force and to engage the second crown at a second location to generate the second force.

In many embodiments, the polymeric shell appliance is configured to couple the first force to the first crown at a first location and the second force to the second crown at a second location, wherein the polymeric shell appliance is configured to couple the first counter force to the first crown at a third location and the second counter force to the second crown at a fourth location, the first location closer to the gingiva than the third location and the second location closer to the gingiva than the second location.

In many embodiments, the polymeric shell appliance is configured to generate a first counter moment with the first counter force and a second counter moment with the second counter force with the first counter moment less than the second counter moment in order to encourage the first tooth to move toward the second tooth.

In many embodiments, the first tooth comprises an anterior tooth and the second tooth comprises a posterior tooth.

In many embodiments, the first tooth comprises a posterior tooth and the second tooth comprises an anterior tooth.

In many embodiments, the posterior tooth comprises one or more posterior teeth comprising one or more of a molar, a premolar, or a canine, and the anterior tooth comprises one or more anterior teeth comprising one or more of a central incisor, a lateral incisor, a cuspid, a first bicuspid, or a second bicuspid.

In many embodiments, one or more of the one or more anterior teeth or the one or more of the posterior teeth are moved together with en masse separation along an arch.

In many embodiments, the method further comprises providing an appliance as in any one of the preceding claims.

In another aspect, a method of moving a first tooth toward a second tooth is provided. The method comprises applying a first force to the first tooth directed away from the second tooth and a second force to the second tooth directed away from first tooth in order to inhibit rotation of the first and the second tooth as one or more of the first tooth or the second tooth are urged toward the other tooth.

In another aspect, an appliance for moving one or more teeth is provided. The appliance comprises: a plurality of tooth receiving cavities to engage a plurality of teeth comprising a first tooth and a second tooth, the plurality of tooth receiving cavities comprising a first cavity shaped to receive the first tooth and a second cavity shaped to receive the second tooth, the first cavity and the second cavity arranged to urge the first tooth in a first direction and the second tooth in a second direction; a first engagement structure to engage a first tooth of the plurality of teeth; and a second engagement structure to engage a second tooth of the plurality of teeth; wherein the first engagement structure and the second engagement structure are arranged to urge the first tooth in a third direction opposite the first direction and the second tooth in a fourth direction opposite the second direction.

In many embodiments, first tooth comprises a first attachment and the first engagement structure comprises a first attachment engaging structure, and the second tooth comprises a second attachment and the second engagement structure comprises a second attachment engaging structure. The first engagement structure, the second engagement structure, the first tooth receiving cavity and the second tooth receiving cavity can be arranged to provide a first counter moment to the first tooth to decrease rotation of the first tooth and a second counter moment to decrease rotation of the second tooth. The first engagement structure can comprise one or more of a first attachment engaging structure, a first power ridge, or a first shape profile corresponding to a surface of the first tooth and the second engagement structure can comprise one or more of a second attachment engaging structure, a second power ridge, or a second shape profile corresponding to the surface of the first tooth.

In many embodiments, the appliance comprises the appliance of any one of the embodiments provided herein.

In another aspect, a system to generate a plurality of appliances for moving a plurality of teeth of a subject is provided. The system comprises: an input; a display; and a processor coupled to the display and the input. The processor comprises instructions embodied on a tangible medium to: display the plurality of teeth of the subject at a plurality of stages of a treatment, each stage corresponding to an appliance of the plurality of appliances; adjust each of the plurality of teeth on the display in response to user input to position the teeth at each stage of the treatment; and determine a shape profile of a polymeric shell appliance shaped for placement on the plurality of teeth, the polymeric shell appliance comprising a plurality of tooth receiving cavities shaped to receive each of the plurality of teeth and provide a differential moments to each of the plurality of teeth in order to move the teeth.

In many embodiments, the processor comprises instructions to determine the shape profile of the appliance with a plurality of attachment engaging structures shaped to engage a plurality of attachments with the plurality of attachments and the plurality of attachment engaging structures shaped and arranged to engage each other and provide the plurality of differential moments to said each of the plurality of teeth.

In many embodiments, the processor comprises instructions to generate an appliance as in any one of the embodiments herein.

In many embodiments, the processor comprises instructions to directly fabricate the polymeric shell appliance with one or more of 3D printing, fused deposition modeling, or stereo lithography.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication as described herein, for example. Alternatively or in combination, the appliance can be fabricated with machining such as an appliance fabricated from a block of material with computer numeric control machining.

Orthodontic systems of the present disclosure can include tooth attachments and one or more orthodontic appliances that engage the attachments when worn by a patient. Appliances having teeth receiving cavities that receive and reposition teeth, e.g., via application of force due to appliance resiliency, are generally illustrated with regard to FIG. 1A. As illustrated, FIG. 1A shows one exemplary adjustment polymeric shell appliance 11 which is worn by the patient in order to achieve an incremental repositioning of each of a plurality of teeth 10 in the jaw. The appliance can include a shell (e.g., polymeric shell) having teeth-receiving cavities that receive and resiliently reposition the teeth. Similar appliances, including those utilized in the Invisalign™ System, are described in numerous patents and patent applications assigned to Align Technology, Inc. including, for example in U.S. Pat. Nos. 6,450,807, and 5,975,893, as well as on the company's website, which is accessible on the World Wide Web (see, e.g., the url "align.com"). Appliances according to the present disclosure can be designed to engage one or more attachments positioned on a tooth of the patient, as further described below. As further described herein, tooth attachments can be designed, oriented, and/or located on a patient's tooth to precisely control the moments produced on a patient's tooth as the appliance is worn by the patient. Customized design and use in orthodontic treatment as described herein can advantageously improve effectiveness of treatment and clinical results by more precisely applying force vectors of necessary magnitude and direction for desired movement. Orthodontic systems of the present disclosure including appliances and tooth attachments as described further provide an efficient force distribution mechanism that can more effectively reduce unwanted force and moment.

The plurality of teeth 10 may comprise one or more attachments 102. The polymeric shell appliance 11 comprises a plurality of tooth receiving cavities 101 shaped to receive each of the plurality of teeth. Each of the plurality of tooth receiving cavities comprises an inner surface profile shaped to correspond to the exterior surface of the received tooth. In many embodiments, the interior surface of the polymeric shell appliance matches at least a portion of the surface of the received tooth, such as opposing surfaces of the profile of the received tooth. The polymeric shell appliance 11 may comprise one or more engagement structures 104 to engage the one or more attachments. In many embodiments, the one or more engagement structures are configured to provide force to the tooth when the appliance engages the one or more attachments. The one or more engagement structures 104 can be configured in many ways to provide force in a predetermined direction to the one or more attachments 102. For example, the one or more engagement structures may comprise a structure configured to receive the one or more attachments 102 with at least some deflection and/or distortion of the engagement structure 104 in order to apply force to the attachment and tooth. The engagement structure 104 may comprise one or more protrusions 105, for example, configured to engage the attachment. In many embodiments, the engagement structure 104 comprises a cavity 106 shaped to receive the attachment. The one or more protrusions 105 protrudes from the polymeric shell inside the cavity 106 with a shape to engage a flat surface of the attachment and apply force in a direction substantially normal to the flat surface of the attachment.

Figure 1B:
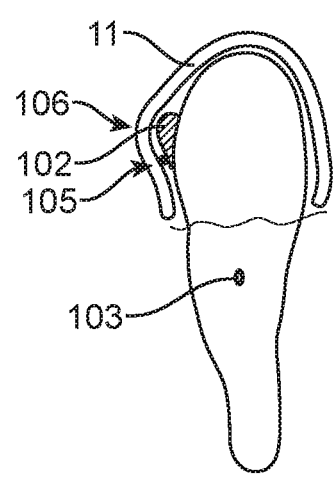
FIG. 1B shows a cross-sectional diagram of an appliance engaging a tooth crown and positioned attachment, in accordance with embodiments.

One or more tooth attachments 102 for delivering a movement force or system of forces is further illustrated with reference to FIG. 1B. The tooth movement can be described with reference to a center of resistance 103. Tooth attachment devices for delivering forces similar to the attachment of FIG. 1B and suitable for incorporation in accordance with embodiments as disclosed herein are described in U.S. application Ser. No. 12/623,340, filed on Nov. 20, 2009, published as U.S. 2010/0138025 on Jun. 3, 2010, entitled "Orthodontic systems and methods including parametric attachments," the entire disclosure of which is incorporated herein by reference. Methods and systems for determining dental aligner geometries suitable for incorporation in accordance with embodiments disclosed herein are described in U.S. application Ser. No. 13/865,091, filed on Apr. 17, 2013, published as U.S. 2013/0230818, entitled "Method and system for optimizing dental aligner geometry," the entire disclosure of which is incorporated herein by reference.

The attachment is coupled to a surface of the tooth on the tooth crown and can couple with or engage a dental appliance or aligner as illustrated in FIG. 1A when the appliance is worn by the patient. When worn by the patient, the appliance engages the tooth crown and attachment, with interaction/contact between an activator, e.g., one or more surfaces or portions of the internal cavity of the appliance, and corresponding surfaces/portions of the tooth attachment and/or tooth crown to apply a system of forces for eliciting tooth movement. Various tooth movements can be accomplished, as further noted below.

As set forth in the prior applications, an appliance can be designed and/or provided as part of a set or plurality of appliances and treatment can be administered according to a treatment plan. In such an embodiment, each appliance may be configured so that one or more tooth-receiving cavities have a geometry corresponding to an intermediate or final tooth arrangement intended for the appliance. Appliance geometries can be further designed or modified (e.g., modified to accommodate or operate in conjunction with tooth attachments) so as to apply a desired force or system of forces to the patient's teeth and elicit a desired tooth movement and gradually reposition teeth to an intended arrangement. The patient's teeth are progressively repositioned from their initial tooth arrangement toward a final tooth arrangement by placing a series of incremental position adjustment appliances over the patient's teeth. The adjustment appliances can be generated all at the same stage or in sets or batches, e.g., at the beginning of a stage of the treatment, and the patient wears each appliance until the pressure of each appliance on the teeth can no longer be felt. A plurality of different appliances (e.g., set) can be designed and even fabricated prior to the patient wearing any appliance of the plurality. At that point, the patient replaces the current adjustment appliance with the next adjustment appliance in the series until no more appliances remain. The appliances are generally not affixed to the teeth and the patient may place and replace the appliances at any time during the procedure. The final appliance or several appliances in the series may have a geometry or geometries selected to overcorrect the tooth arrangement, i.e., have a geometry which would (if fully achieved) move individual teeth beyond the tooth arrangement which has been selected as the "final." Such over-correction may be desirable in order to offset potential relapse after the repositioning method has been terminated, e.g., to permit movement of individual teeth back toward their pre-corrected positions. Over-correction may also be beneficial to speed the rate of correction, e.g., by having an appliance with a geometry that is positioned beyond a desired intermediate or final position, the individual teeth will be shifted toward the position at a greater rate. In such cases, the use of an appliance can be terminated before the teeth reach the positions defined by the appliance.

Orthodontic appliances, such as the appliance illustrated in FIG. 1A, impart forces to the crown of a tooth and/or an attachment positioned on the tooth at each point of contact between a tooth receiving cavity of the appliance and received tooth and/or attachment. The magnitude of each of these forces and their distribution on the surface of the tooth determines the type of orthodontic tooth movement which results. Types of tooth movements are conventionally delineated as extrusion, intrusion, rotation, tipping, translation and root movement. Tooth movement of the crown greater than the movement of the root is referred to as tipping. Equivalent movement of the crown and root is referred to as translation. Movement of the root greater than the crown is referred to as root movement. Tooth movements may be in any direction in any plane of space, and may comprise one or more of rotation or translation along one or more axes.

In many embodiments, the appliances herein are used to reposition one or more of the patient's teeth in order to treat an orthodontic condition and/or achieve a desired tooth arrangement. For example, an orthodontic appliance as described herein can be used to reposition teeth in order to reduce the size of a space between teeth, also known as "space closure." A space may be present in a patient's arch due to extraction of one or more teeth, such as a first bicuspid extraction or a second bicuspid extraction. Space closure may be performed by repositioning one or more teeth near the extraction site, e.g., by moving one or more teeth anterior to the extraction site in a posterior direction, by moving one or more teeth posterior to the extraction site in an anterior direction, or a combination thereof. In many embodiments, space closure involves moving one or more anterior teeth towards the space while maintaining the posterior teeth in their current locations. Alternatively, space closure can involve moving one or more posterior teeth towards the space while maintaining the anterior teeth in their current locations. Optionally, one or more anterior teeth and one or more posterior teeth are moved towards each other in order to close a space. In such embodiments, the anterior teeth may be moved prior to, concurrently with, or after moving the posterior teeth, and the distance over which the anterior teeth are moved can be greater than, less than, or equal to the distance over which the posterior teeth are moved.

Figure 2:
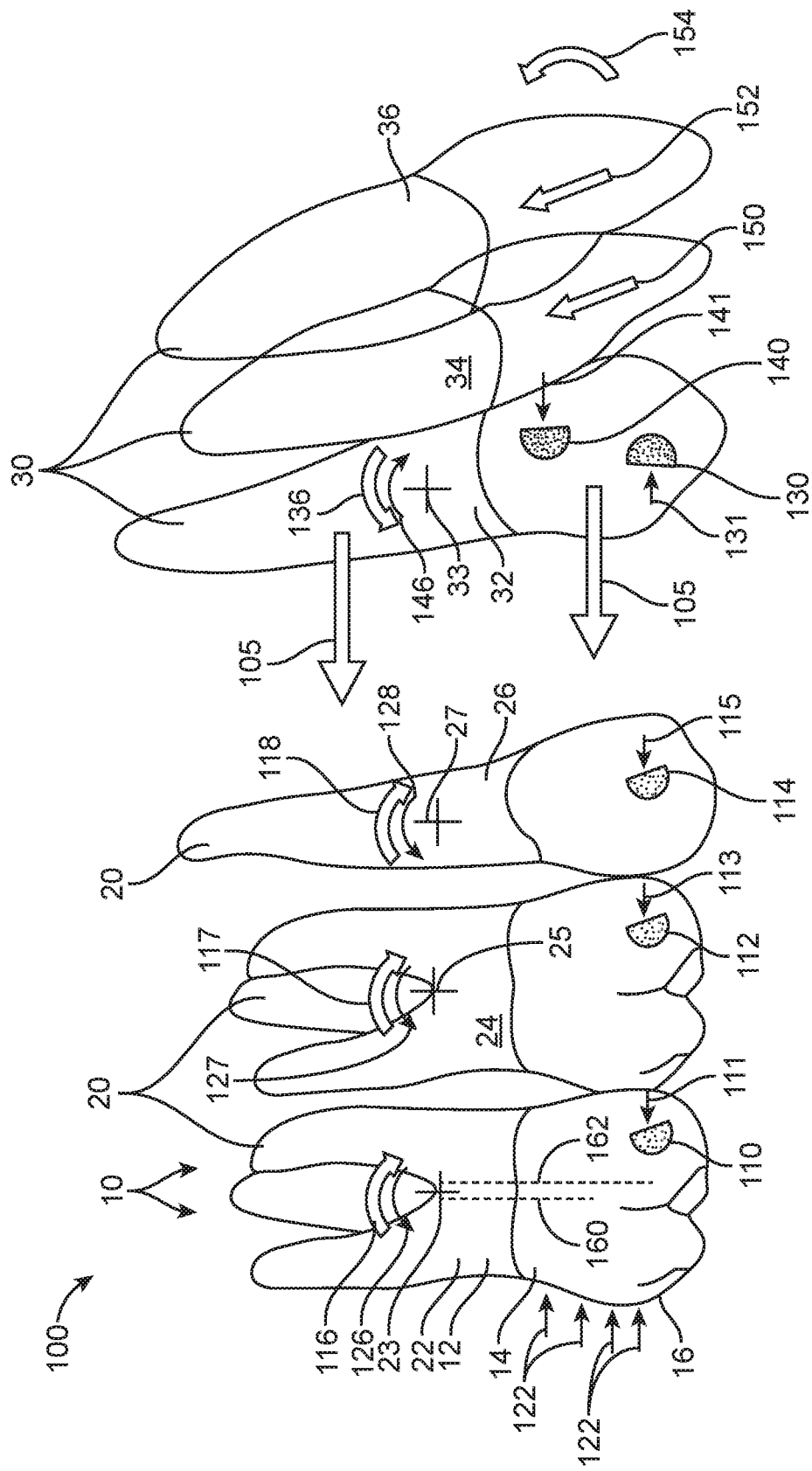
FIG. 2 shows components of an alignment apparatus and corresponding forces, in accordance with embodiments.

FIG. 2 shows components of an alignment apparatus 100 and corresponding forces. The alignment apparatus 100 may comprise one or more of the attachments and polymeric shell appliances configured and arranged to provide teeth moving forces as described herein. Each tooth of the plurality of teeth 10 comprises a root 12 and a crown 14, and the polymeric appliance (omitted for clarity) can apply forces to the crown and/or attachments on the crown in order to move each tooth. Each tooth of the plurality of teeth can move with respect to a center of resistance.

The plurality of teeth 10 may comprise two or more of any teeth of the mouth. The plurality of teeth 10 may comprise one or more of a plurality of posterior teeth 20 such as a plurality of molars or bicuspids or combinations thereof. The plurality of posterior teeth 20 may comprise one or more of a bicuspid 26, a first molar 24 or a second molar 22, for example. The plurality of posterior teeth may comprise a third molar comprising a wisdom tooth, for example. Alternatively or in combination, the plurality of teeth 10 may comprise one or more of a plurality of anterior teeth 30. The plurality of anterior teeth may comprise one or more of a bicuspid, a cuspid (canine), or incisor, for example. In many embodiments, the plurality of anterior teeth 30 comprises a cuspid 32 (canine), and one or more adjacent incisors, such as incisor 34 and incisor 36.

In many embodiments, each of the plurality of attachments (e.g., attachments 110, 112, 114, and 130, and 140) comprises a flat surface to engage a corresponding respective engagement structure of the aligner (not shown). The engagement structure of the aligner may comprise a protrusion that engages the flat surface in order to impart force from the polymeric shell appliance to the attachment and tooth with the attachment. The protrusion of the engagement structure can be configured in many ways, and may comprise a protrusion on an inner surface of an attachment receiving cavity of the appliance or a ball shaped structure that engages the flat surface, for example. In many embodiments, the attachment engaging structure of the appliance engages the attachment so as to exert force in a direction substantially normal to the flat surface of the attachment.

Many embodiments as disclosed herein are particularly well suited for closing extraction sites, such as an extraction site between the posterior teeth 20 and the anterior teeth 30. In many embodiments one or more teeth are moved to fill an extraction site with a movement in a target direction 105. Although the target direction 105 can extend in any direction, in many embodiments the target direction 105 extends along a sagittal direction (e.g., along a mesial-distal direction). The amount of tipping and/or counter rotation of the teeth can be controlled with the size and shape of the appliance, engagement structures of the appliance, and/or attachments, in order to direct movement of one or more teeth with appropriate amounts of force.

In many embodiments, when moving a tooth in order to perform space closure or other orthodontic treatments, it is desirable to move the tooth root concurrently with the tooth crown, such that the tooth translates along the target direction with little or no tipping, also known as a "bodily movement" of the tooth. For instance, when repositioning one or more anterior teeth in order to perform space closure, it may be desirable to retract the anterior teeth without tipping the crowns towards the tongue so as to avoid loss of inclination and/or change in vertical height of the tooth.

Tipping of a tooth may occur when the appliance applies force primarily to the tooth crown and/or when the amount of force on the tooth crown exceeds a certain threshold value. In many embodiments, each tooth comprises a center of resistance to forces applied to the tooth, and the tooth may rotate about the center of resistance, or approximately rotate in three dimensions about the center of resistance. The center of resistance of the tooth may be located away from the tooth crown such that application of force onto the crown results in a moment to the tooth about the center of resistance that elicits tooth rotation.

For example, referring again to the embodiment of FIG. 2, the first molar 24 may comprise a center of resistance 25 located near the trifurcation of the roots. The second molar 22 may comprise a center of resistance 23 located near the trifurcation of the roots. The bicuspid 26 may comprise a center of resistance 27, for example. The cuspid 32 may comprise a center of resistance 33. Each of the incisor 34 and the incisor 36 may comprise a center of resistance. The location of each of the centers of resistance of the plurality of teeth as described herein may correspond to a center of resistance known to a person of ordinary skill the art.

The application of force to a tooth in order to move the tooth can result in a moment to the tooth about the center of resistance. In many embodiments, a target tooth to be moved such as cuspid 32 receives a force from the polymeric shell appliance, which can be a direct force from the surface of the interior of the shell or indirect force through an attachment, or combinations thereof. For instance, attachment 140 can be optionally placed on the tooth 32 in order to direct the tooth 32 with a planned movement. Engagement of attachment 140 with polymeric shell appliance 11 (e.g., via an engagement structure located on polymeric shell appliance 11) can result in a force vector to the attachment 140 and tooth as indicated with arrow 141. As tooth 32 resists forces with a center of resistance 33, a moment 146 about the center of resistance can result. The moment 146 can result in rotation of tooth 32, e.g., tipping.

In many embodiments, the appliances herein are shaped to modify the force system applied to the tooth so as to elicit translational tooth movement with little or no tipping movement. For instance, the appliances herein can be shaped to reduce the amount of force applied to the crown, e.g., to within a range from about 0.5 N to about 3 N. Modification of the force system can be achieved by modifying the shape of a tooth receiving cavity, use of attachments and attachment engagement structures, use of external force producing mechanisms such as elastics, or combinations thereof, as discussed above and herein.

Alternatively or in combination, the appliances herein can be shaped to modify the energy distribution on the tooth so as to elicit translational tooth movement with little or no tipping movement. For example, the appliances herein can be shaped to distribute energy onto the tooth roots as well as onto the tooth crown. Modification of the energy distribution can be achieved by modifying the shape of a tooth receiving cavity, use of attachments and attachment engagement structures, use of external force producing mechanisms such as elastics, or combinations thereof, as discussed above and herein.

Various methods can be used to alter the force system and/or energy distribution on a tooth in order to elicit bodily movement of the tooth. For instance, in many embodiments, the appliances herein are shaped to apply a counter moment onto the tooth that opposes the moment that would otherwise produce tooth rotation, such that the movement of a tooth is provided with a differential moment between the moment and the counter moment. The counter moment can be produced by modifying a position and/or orientation of the tooth receiving cavity relative to the position and/or orientation of the corresponding received tooth such that when the appliance is worn by the patient, the tooth receiving cavity applies the counter moment onto the tooth. Alternatively or in combination, in many embodiments, an attachment on a tooth is provided to generate a counter moment, such that the movement of a tooth is provided with a differential moment between the moment and the counter moment. The counter moment can be generated by interaction between the attachment and an engagement structure located on the appliance when the appliance is worn. In many embodiments, the attachment provided to generate the counter moment is located farther away from the center of resistance than the locus of engagement of the attachment or crown surface that urges the target tooth in the target direction, such that the force vector in the target direction is greater than the counter force in the opposite direction in order to generate the differential moment and urge the target tooth in the target direction.

Referring again to the exemplary embodiment of FIG. 2, a counter moment 136 can be provided with an attachment 130 or directed engagement of the tooth with the polymeric shell appliance 11 or combinations thereof, which generates a force vector as shown with arrow 131, opposite the force vector of attachment 140 shown with arrow 141. In many embodiments, the attachment 140 that urges the tooth 32 in target direction 105 is located closer to the center of resistance 33 and gingiva than the counter attachment 130, such that counter moment 136 can approximate moment 146 in order to control rotation of tooth 32 as the tooth moves along target direction 105. For example, counter moment 136 can be less than moment 146 to allow the tooth to tip with rotation in the target direction 105, greater than moment 146 in order to rotate the crown away from target direction 105, or similar to moment 146 in order to maintain an orientation of tooth 32 when the tooth moves along target direction 105. In many embodiments, the appliance 11 comprising the polymeric shell comprises engagement structures to engage the attachments, and the locations and shapes of the engagement structures can be arranged to provide suitable amounts of counter forces in order to provide counter moments to direct tooth movement along a target path.

In many embodiments, a posterior most tooth comprises a substantial exposed surface 16 suitable for engagement with the polymeric appliance. The polymeric shell appliance 11 can generate force along the posterior surface of the crown at a locus of engagement as indicated with arrows 122. The anteriorly directed force indicated with arrows 122 generates a moment 126 about the center of resistance 23 of second molar 22, for example. In many embodiments, the force of the appliance indicated with arrows 122 generates a moment 127 around the center of resistance 25 of first molar 24, and a moment 128 about the center of resistance 27 of the bicuspid 26, for example. One or more of the plurality of posterior teeth may have an attachment placed thereon to generate a counter moment.

Attachment 110 can generate a counter force as indicated with arrow 111 opposite the force indicated with arrows 122 in order to generate a counter moment 116. The counter moment 116 can be greater than moment 126, such that the crown of second molar 22 is rotated away from first molar 24, for example with the differential moment resulting from the sum of moment 126 with counter moment 116. Alternatively, counter moment 116 can be less than moment 126 and also inhibit rotation of second molar 22 toward first molar 24.

The moment and counter moment of each tooth can be determined based on the amount of force applied to the tooth and the distance from the center of resistance to the location of the force along the elongate axis of the tooth. The force shown with arrows 122 is applied at distance 160 along the elongate axis of the tooth from the center of resistance 23. The counter force shown with arrows 111 is applied at a distance 162 from the center of resistance 23. In many embodiments, the moment 126 approximately equals the product of the distance 160 and the force represented by arrows 122. The counter moment 112 approximately equals the product of distance 162 and the counter force on attachment 110 represented by arrow 111. A person of ordinary skill in the art will recognize may ways to determine the moments as described herein, for example with finite element modeling and integrating the moments at a plurality of positions relative to the center of resistance along the tooth.

Attachment 112 can generate a counter force as indicated with arrow 113 opposite the force indicated with arrows 122 in order to generate a counter moment 117. The counter moment 117 can be greater than moment 127, such that the crown of first molar 24 is rotated away from bicuspid 26, for example with the differential moment resulting from the sum of moment 127 with counter moment 117. Alternatively, counter moment 117 can be less than moment 127 and also inhibit rotation of first molar 24 toward bicuspid 26.

Attachment 114 can generate a counter force as indicated with arrow 115 opposite the force indicated with arrows 122 in order to generate a counter moment 118. The counter moment 118 can be greater than moment 128, such that the crown of bicuspid 26 is rotated away from the target tooth comprising cuspid 32, for example with the differential moment resulting from the sum of moment 128 with counter moment 118. Alternatively, counter moment 118 can be less than moment 128 and also inhibit rotation of bicuspid 26 toward the target tooth comprising cuspid 32.

In many embodiments, a ratio is defined between the magnitude of the total moment applied to the tooth and the amount of force applied to the tooth along the targeted movement direction, referred to herein as the "moment-force ratio." For instance, in the embodiment of FIG. 2, the moment-force ratio for tooth 32 is defined as the ratio between the sum of moment 146 and counter moment 136, and force 141. The value of the moment-force ratio may determine the resultant movement of the tooth, e.g., whether the tooth translates, rotates, or both. In many embodiments, the appropriate moment-force ratio to be applied to a tooth in order to produce translation while reducing rotation varies based on the characteristics of the particular tooth, e.g., tooth size, complexity of the root structure, and/or location of the center of resistance. For example, for a posterior tooth, the moment-force ratio to produce translation with little or no rotation can be within a range from about 4 mm to about 10 mm. As another example, for an anterior tooth, the moment-force ratio to produce translation with little or no rotation can be within a range from about 6 mm to about 15 mm.

In many embodiments, it is desirable to move a first group of one or more teeth while maintaining a second group of one or more teeth ("anchoring teeth") in their current arrangement. For instance, space closure may be performed by retracting one or more anterior teeth while anchoring one or more posterior teeth, or by advancing one or more posterior teeth while anchoring one or more anterior teeth. In the embodiment of FIG. 2, one or more of the plurality of posterior teeth 20 can be configured with differential moments in order to control orientation of the one or more teeth. In many embodiments, counter moments of posterior teeth are arranged to inhibit movement of the posterior teeth. Work in relation to embodiments suggests that rotating the crown of the tooth away from a force to move a neighboring tooth can inhibit movement of the tooth, and rotation of a crown of a tooth toward a force from a neighboring tooth can facilitate movement of the tooth toward the neighboring tooth. In many embodiments, the plurality of posterior teeth 20 comprises a block of adjacent teeth configured to anchor the appliance and move the target tooth with little or no movement of the plurality of adjacent anchor teeth. Alternatively or in combination, one or more of the plurality of posterior teeth 20 can be configured to move toward the target tooth, for example. Although certain embodiments herein are described in the context of repositioning anterior teeth while anchoring posterior teeth, it shall be appreciated that the present disclosure is equally applicable to repositioning posterior teeth while anchoring anterior teeth.

The systems, methods, and devices of the present disclosure can be used to apply differential moments to a patient's teeth in order to reduce or inhibit movement of one or more anchoring teeth, also referred to herein as "increasing anchorage." In many embodiments, an orthodontic appliance is shaped to apply a moment to a first group of one or more teeth to be moved (e.g., to close a space) and apply a counter moment to a second group of one or more anchoring teeth, thereby producing a differential moment between the first and second groups of teeth. A differential moment can be produced by modifying the shape of one or more tooth receiving cavities, use of attachments and attachment engagement structures, use of external force producing mechanisms such as elastics, or combinations thereof, as discussed above and herein.

In many embodiments, differential moments are provided between groups of teeth as described herein in order to provide tooth movement with improved control. In many embodiments, a first group of teeth comprises a first moment and a second group of teeth comprises a second moment, and a differential moment between a first moment of the first group of teeth and a second moment of the second group of teeth allows selective movement of the teeth, e.g., anterior and/or posterior teeth. For example, in many embodiments, a large differential moment is provided between a group of one or more posterior teeth and a group of one or more anterior teeth in order to anchor the posterior teeth. The counter moment of the posterior teeth can be greater than the moment of the anterior teeth in order to anchor the posterior teeth, for example, to provide maximum anchorage to the posterior teeth. In alternative embodiments, a large differential moment is provided between a group of one or more posterior teeth and a group of one or more anterior teeth in order to anchor the anterior teeth. The counter moment of the anterior teeth can be greater than the moment of the posterior teeth in order to anchor the anterior teeth, for example, to provide maximum anchorage to the anterior teeth.

In many embodiments, a plurality of teeth are coupled together such that they collectively behave as a single unit, e.g., in order to increase anchorage of the teeth. Teeth that are coupled together in this manner may exhibit greater resistance to repositioning. The shell appliances described herein may provide a greater capacity for creating anchorage compared to other types of appliances (e.g., wire and bracket appliances) due to the increased degree of contact between the appliance surface and the surfaces of the received teeth (e.g., occlusal, lingual, and/or buccal surfaces). A polymeric shell appliance can be configured to couple groups of one or more teeth to each other in many ways. For example, a first group of one or more teeth can be coupled to a second group of one or more teeth. In many embodiments, the first group of one or more teeth comprises a first plurality of teeth, and the polymeric shell appliance comprises a shape to generate the first counter moment with each of the first plurality of adjacent teeth, in which the first counter moment comprises a combination of similarly oriented moments from said each of the first plurality of adjacent teeth as shown and described herein, for example with reference to FIG. 2. The second group of one or more teeth may comprise a second plurality of teeth and the polymeric shell appliance may comprise a shape to generate the second counter moment with each of the second plurality of adjacent teeth, in which the second counter moment comprises a combination of similarly oriented moments from said each of the second plurality of adjacent teeth.

In many embodiments, a tooth comprising a moment comprises a tooth with a force applied from an appliance to generate a moment or counter moment about the center of resistance. A group of teeth comprising a moment or a counter moment may comprise an appliance engaging one or more of the teeth to provide the moment or counter moment about the center of resistance.

In many embodiments, the plurality of tooth receiving cavities is shaped and arranged to balance the differential moment between the first one or more teeth and the second one or more teeth with the polymeric appliance extending between the first group of one or more teeth and the second group of one or more teeth. Alternatively or in combination, the plurality of tooth receiving cavities can be shaped and arranged to balance the first counter moment and the second counter moment between the first one or more teeth and the second one or more teeth In many embodiments, a counter moment is provided with a group of one or more teeth, for example with a plurality of posterior teeth. The counter moment may comprise a sum of the counter moments of the each tooth of the group of teeth. The combined counter moment may comprise a counter moment about a combined center of resistance away from the center of resistance of each of the teeth of the group. A person of ordinary skill in the art can determine a center of resistance for a group of teeth with one or more known ways and in accordance with the embodiments disclosed herein.

Referring again to the embodiment of FIG. 2, in many embodiments, moment 136 opposes moment 116, moment 117 and moment 118, for example. Moments 116, 117 and 118 are similarly oriented as shown. With a right handed triple coordinate system, moment 136 will be oriented toward one side of the plurality of teeth (outward from the page toward the viewer) and moment 116, moment 117, and moment 118 will be similarly oriented (inwardly from the page away from the viewer) toward an opposite side of the teeth from moment 136. For example moment 136 can be oriented toward a buccal side of the group of teeth, and moment 116, moment 117, and moment 118 can be similarly oriented toward a lingual side of the group of teeth. The sum of moment 116, moment 117, and moment 118 can be considered as a counter moment on the posterior teeth 20 that opposes the moment 136 on the one or more anterior teeth 20. In many embodiments, the counter moment on the posterior teeth 20 increases anchorage of the posterior teeth 20 while the moment 136 on the anterior teeth 20 induces movement of the anterior teeth.

Although reference is made to a plurality of posterior teeth as an anchoring block with counter moments, in many embodiments, the plurality of posterior teeth can be configured as an anchoring block without counter rotation and counter moments and without attachments in order to move one or more target teeth with the polymeric shell coupled to the plurality of posterior teeth and the one or more target teeth.

In many embodiments, movement of one or more teeth along a target vector can result in movement of one or more adjacent teeth. For example, as depicted in FIG. 2, movement of cuspid 32 toward the extraction site can result in extrusion of one or more adjacent incisors, for example incisor 34 and incisor 36. In many embodiments, polymeric shell appliance 11 is configured to provide one or more activation forces to one or more teeth. The polymeric shell appliance 11 can be configured with activation of the polymeric shell to apply an activation force 150 to incisor 34. In many embodiments, the activation force 150 is not sufficient to intrude incisor 34 with incisor 34 in the target position, and activation force 150 is sufficient to inhibit extrusion of incisor 34. Extrusion of incisor 34 with movement of cuspid 32 can result in an increased deflection of appliance 11 and increased activation force 150 in order to inhibit further extrusion of incisor 34. Similarly, the polymeric shell appliance can be configured to apply an activation force 152 to incisor 36, and the activation force 152 may be insufficient to intrude incisor 36 while inhibiting extrusion of incisor 36. Additionally, as discussed above and herein, the polymeric shell appliance can be configured to apply a counter moment 154 (e.g., lingual root torque) to incisors 32, 34, and 36 to prevent tipping while the incisors are being retracted.

Optionally, the appliances herein can include one or more external force producing mechanisms. The external force producing mechanism can be any device capable of being coupled to the teeth in order to exert force onto the teeth, such as an elastic (e.g., class I elastic, class II elastic, class III elastic), spring, wire, or the like. The external force producing mechanism can be separate from an orthodontic appliance worn over the teeth. The external force producing mechanism can be coupled directly to one or more teeth (e.g., via bonding or adhesives), or may be indirectly coupled to one or more teeth (e.g., via an attachment or button mounted on a surface of a tooth, a hook or other fastening feature located on an aligner, a temporary anchorage device (TAD) implanted into bone of the upper jaw or lower jaw, or combinations thereof). In embodiments where the external force producing mechanism is coupled to a tooth-mounted attachment or button, the shell appliance can include a hole or cut-out accommodating the attachment or button. In many embodiments, the external force producing mechanism includes a first end coupled directly or indirectly to a tooth in the patient's upper jaw and a second end coupled directly or indirectly to a tooth in the patient's lower jaw. Alternatively, the ends of the external force producing mechanism can be directly or indirectly coupled to different teeth on the same jaw (e.g., upper jaw or lower jaw).

An external force producing mechanism can be used to refine the delivery of a force, moment, and/or counter moment on teeth in order to provide increased control over movement or anchorage of the teeth. In many embodiments, an external force producing mechanism is coupled to one or more teeth in order to increase anchorage of one or more anchoring teeth. For example, the external force producing mechanism can apply a force to a group of one or more anchoring teeth along a direction that reduces or inhibits movement of the group of anchoring teeth, also known as "backing up anchorage." An external force producing mechanism can be referred to herein as an "external anchorage producing mechanism." Alternatively or in combination, an external force producing mechanism can be coupled to one or more teeth in order to increase movement of one or more teeth, e.g., for space closure.

Figure 6A:
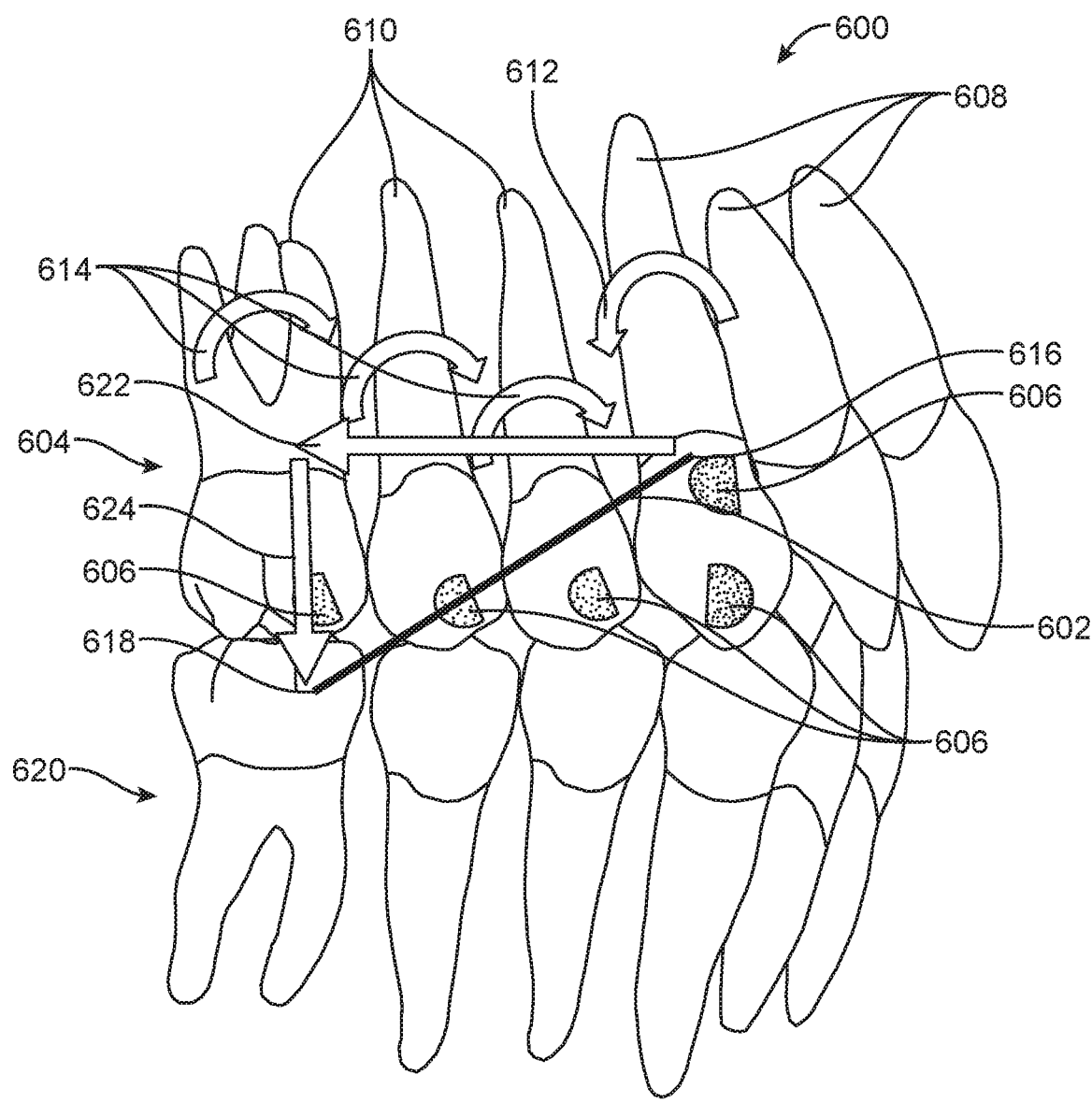
FIG. 6A shows an alignment apparatus with an external force producing mechanism, in accordance with embodiments.

FIG. 6A illustrates an alignment apparatus 600 including an external force producing mechanism 602. The alignment apparatus 600 includes a shell appliance (omitted for clarity) worn over a plurality of upper teeth 604. Optionally, the alignment apparatus 600 includes a plurality of attachments 606 attached to the upper teeth 604 and arranged to interact with the shell appliance in order to exert forces onto the teeth 604. In many embodiments, the teeth 604 include a group of one or more anterior teeth 608 and a group of one or more posterior teeth 610, and the alignment apparatus produces one or more moments 612 on the anterior teeth 608 and one or more counter moments 614 on the posterior teeth 610. The moment(s) 612 and counter moment(s) 614 can elicit retraction of the anterior teeth 608 while maintaining anchorage of the posterior teeth 610 as described above and herein, e.g., to close a space between the anterior teeth 608 and posterior teeth 610.

In the depicted embodiment, the external force producing mechanism 602 is a class II elastic with a first end 616 coupled to one or more upper teeth 604 (e.g., an upper canine) and a second end 618 coupled to one or more lower teeth 620 (e.g., a lower molar). The first end 616 can be coupled directly to the crown of an upper tooth 604 or indirectly (e.g., via a tooth-mounted attachment or the shell appliance). The second end 618 can be coupled directly to the crown of a lower tooth 620 or indirectly (e.g., via a tooth-mounted attachment or a shell appliance worn over the lower teeth 620). The first end 616 can be positioned anteriorly relative to the second end 618 so as to produce a tension within the external force producing mechanism 602 that pulls the upper arch in a posterior direction. This tension can be considered as being made up of a distal force component 622 and an extrusive force component 624 that are exerted on the upper arch. It shall be appreciated that the tension can also be considered as being made up of a mesial force component and an extrusive force component that are exerted on the lower arch (not shown). In many embodiments, the distal force component 622 is transmitted to the posterior teeth 610 of the upper arch so as to enhance anchorage and maintain their position within the upper arch (e.g., inhibit anterior movement). Optionally, the distal force component 622 is transmitted to the anterior teeth 608 of the upper arch in order to enhance posterior movement, e.g., for space closure.

Figure 6B:
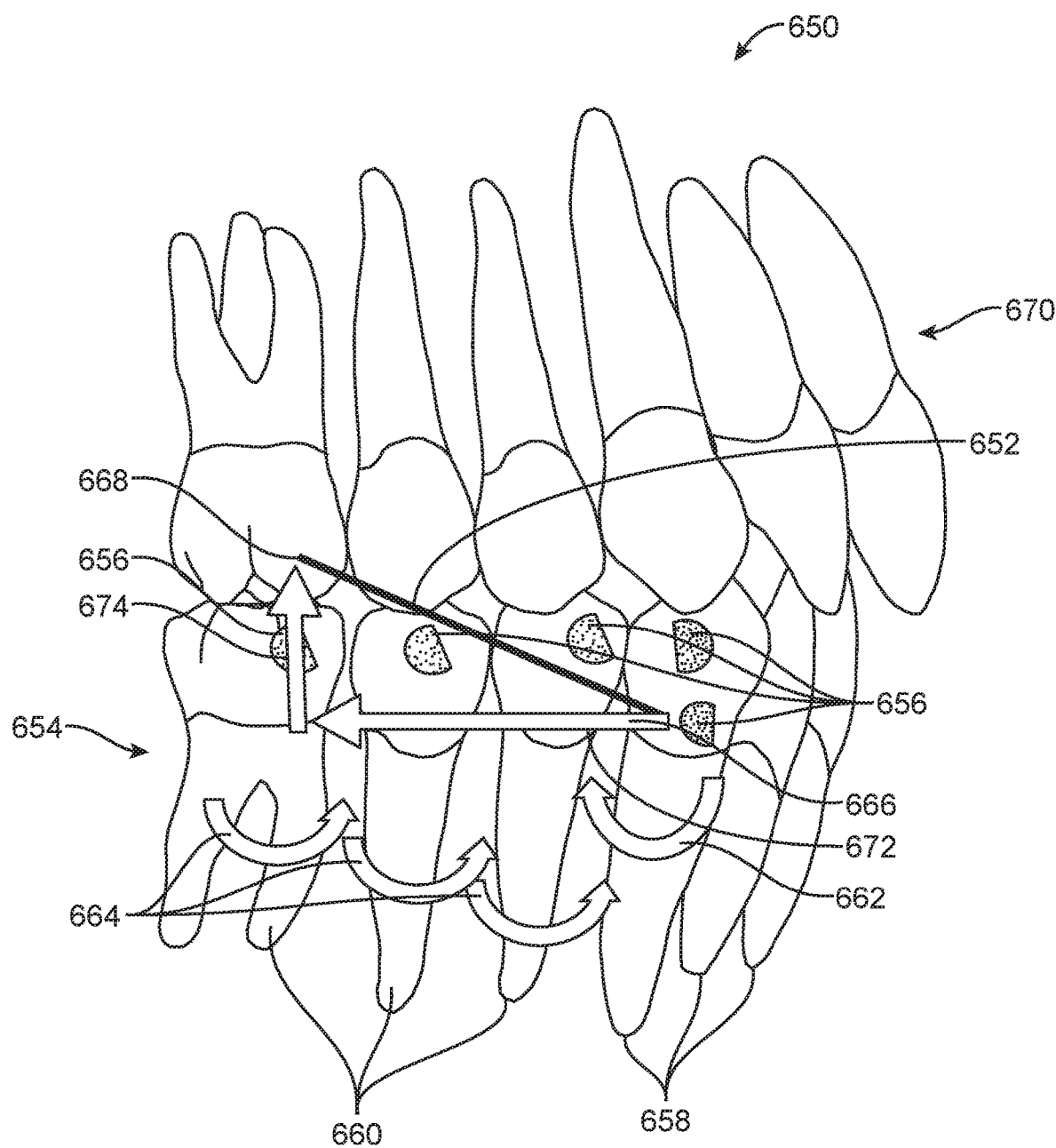
FIG. 6B shows an alignment apparatus with an external force producing mechanism, in accordance with embodiments.

FIG. 6B illustrates an alignment apparatus 650 including an external force producing mechanism 652. The alignment apparatus 650 includes a shell appliance (omitted for clarity) worn over a plurality of lower teeth 654. Optionally, the alignment apparatus 650 includes a plurality of attachments 656 attached to the lower teeth 654 and arranged to interact with the shell appliance in order to exert forces onto the teeth 654. In many embodiments, the teeth 654 include a group of one or more anterior teeth 658 and a group of one or more posterior teeth 660, and the alignment apparatus produces one or more moments 662 on the anterior teeth 658 and one or more counter moments 664 on the posterior teeth 660. The moment(s) 662 and counter moment(s) 664 can elicit retraction of the anterior teeth 658 while maintaining anchorage of the posterior teeth 660 as described above and herein, e.g., to close a space between the anterior teeth 658 and posterior teeth 660.

In the depicted embodiment, the external force producing mechanism 652 is a class III elastic with a first end 666 coupled to one or more lower teeth 654 (e.g., a lower canine) and a second end 668 coupled to one or more upper teeth 670 (e.g., an upper molar). The first end 666 can be coupled directly to the crown of a lower tooth 654 or indirectly (e.g., via a tooth-mounted attachment or the shell appliance). The second end 668 can be coupled directly to the crown of a upper tooth 670 or indirectly (e.g., via a tooth-mounted attachment or a shell appliance worn over the upper teeth 670). The first end 666 can be positioned anteriorly relative to the second end 668 so as to produce a tension within the external force producing mechanism 652 that pulls the lower arch in a posterior direction. This tension can be considered as being made up of a distal force component 672 and an extrusive force component 674. It shall be appreciated that the tension can also be considered as being made up of a mesial force component and an extrusive force component that are exerted on the upper arch (not shown). In many embodiments, the distal force component 672 is transmitted to the posterior teeth 660 of the lower arch so as to enhance anchorage and maintain their position within the lower arch (e.g., inhibit anterior movement). Optionally, the distal force component 672 is transmitted to the anterior teeth 658 of the lower arch in order to enhance posterior movement, e.g., for space closure.

Figure 7:
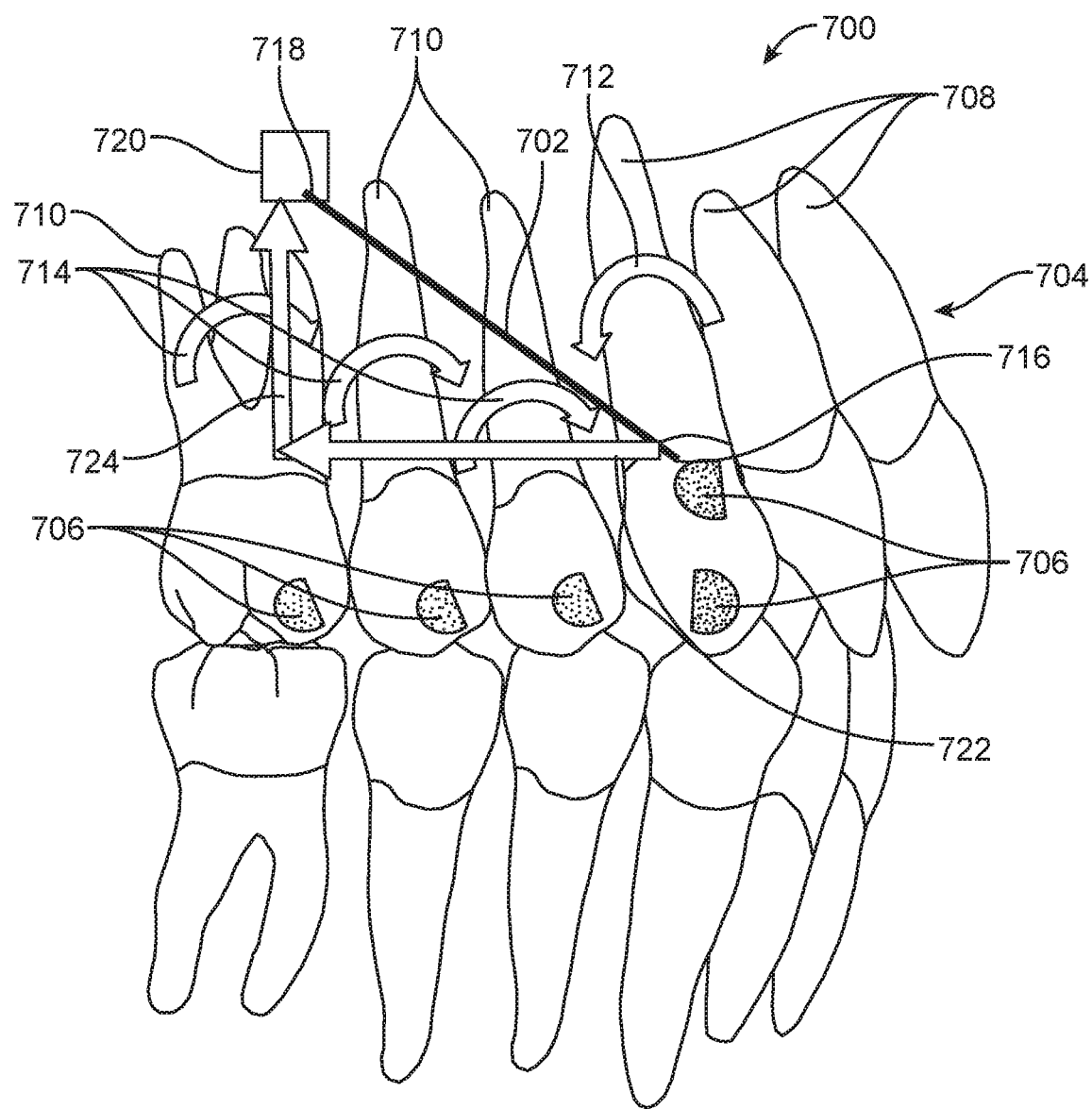
FIG. 7 shows an alignment apparatus with an external force producing mechanism, in accordance with embodiments.

FIG. 7 illustrates an alignment apparatus 700 including an external force producing mechanism 702. The alignment apparatus 700 includes a shell appliance (omitted for clarity) worn over a plurality of upper teeth 704. Optionally, the alignment apparatus 700 includes a plurality of attachments 706 attached to the upper teeth 704 and arranged to interact with the shell appliance in order to exert forces onto the teeth 704. In many embodiments, the teeth 704 include a group of one or more anterior teeth 708 and a group of one or more posterior teeth 710, and the alignment apparatus produces one or more moments 712 on the anterior teeth 708 and one or more counter moments 714 on the posterior teeth 710. The moment 712 and counter moment(s) 714 can elicit retraction of the anterior teeth 708 while maintaining anchorage of the posterior teeth 710 as described above and herein, e.g., to close a space between the anterior teeth 708 and posterior teeth 710.

In the depicted embodiment, the external force producing mechanism 702 has a first end 716 coupled to one or more upper teeth 704 (e.g., an upper canine) and a second end 718 coupled to a temporary anchorage device (TAD) 720 implanted in the bone of the patient's upper jaw. The first end 716 can be coupled directly to the crown of an upper tooth 704 or indirectly (e.g., via a tooth-mounted attachment or the shell appliance). The first end 716 can be positioned anteriorly relative to the second end 718 so as to produce a tension within the external force producing mechanism 702 that pulls the upper arch in a posterior direction. This tension can be considered as being made up of a distal force component 722 and an extrusive force component 724. In many embodiments, the distal force component 722 is transmitted to the posterior teeth 710 so as to enhance anchorage and maintain their position within the upper arch (e.g., inhibit anterior movement). Optionally, the distal force component 722 is transmitted to the anterior teeth 708 in order to enhance posterior movement, e.g., for space closure.

In alternative embodiments, an external force producing mechanism can be coupled between a lower tooth and a TAD in the patient's lower jaw so as to apply a distal force component to the teeth of the lower jaw. Other configurations and combinations are also possible (e.g., an external force producing mechanism coupled between a TAD in the upper jaw and a lower tooth, or an external force producing mechanism coupled between a TAD in the lower jaw and an upper tooth) and fall within the scope of the present disclosure. Additionally, it shall be appreciated that the embodiments of external force producing mechanisms described herein can be modified in order to increase anchorage of one or more anterior teeth while inducing movement of one or more posterior teeth, or vice-versa. For example, a class III elastic can be used to support anchorage of one or more posterior teeth in the lower arch, e.g., with one end of the class III elastic coupled to a TAD in the posterior region of the upper arch so as to facilitate retraction of one or more anterior teeth in the lower arch. As another example, a class II elastic can be used to support anchorage of one or more posterior teeth in the upper arch, e.g., with one end of the class II elastic coupled to a TAD in the posterior region of the lower arch so as to facilitate retraction of one or more anterior teeth in upper arch.

The orthodontic shell appliances of the present disclosure can include teeth receiving cavities shaped to produce the forces, moments, and/or counter moments described herein. In many embodiments, a tooth receiving cavity comprises a position and/or orientation that is away from (e.g., different from) the current position and/or orientation of a corresponding received tooth, and the deflection and/or deformation of the tooth-receiving cavity due to the mismatch between the positions and/or orientations results in application of force to the tooth. The position and/or orientation of the tooth receiving cavity can be configured to apply a force system to the tooth in order to elicit repositioning of the tooth to a targeted position and/or orientation. The position and/or orientation of the tooth receiving cavity may be substantially similar to the targeted position and/or orientation of the received tooth. Alternatively, the position and/or orientation of the tooth receiving cavity may be away from (e.g., different from) a targeted position and/or orientation of the received tooth.

Figure 3A:
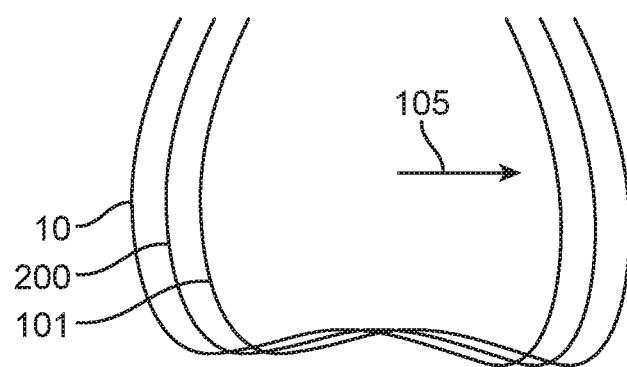
FIG. 3A shows a tooth position prior to completion of a stage of treatment, a target position upon completion of the stage, and a position and orientation of a tooth receiving cavity to complete the stage of treatment, in accordance with embodiments.

FIG. 3A shows a tooth position prior to completion of a stage of treatment, a target position upon completion of the stage, and a position and orientation of a tooth receiving cavity to complete the stage of treatment. A received tooth of the plurality of teeth 10 comprises a position and orientation prior to placement of the appliance 11. A target position and orientation 200 of the tooth upon completion of the treatment stage can be determined with user input. Each of the plurality of tooth receiving cavities 101 of the polymeric shell appliance 11 comprises one or more of a position or orientation away from the target position and orientation along the targeted direction of movement 105. The targeted movement may comprise a movement vector, with the position and orientation of the tooth receiving cavity position away from the targeted position and orientation, for example. The received tooth may comprise one or more attachments and the polymeric shell may comprise one or more engagement structures to provide a differential moment as described herein.

Figure 3B:
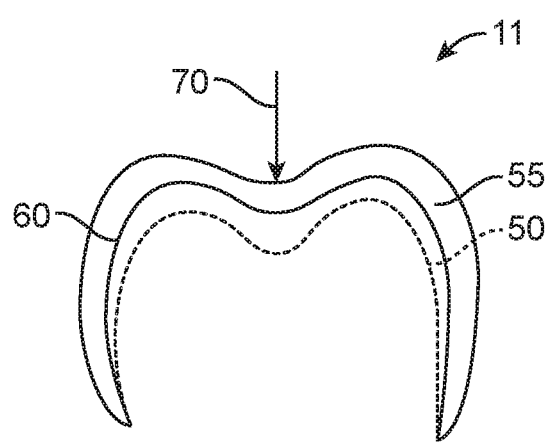
FIG. 3B shows a polymeric shell appliance configured with one or more activation sites to store energy with a tooth at a target position and orientation comprising a non-extruded position and orientation of the tooth, wherein the force is oriented in an intrusive direction and insufficient to intrude the tooth and sufficient to inhibit extrusion of the tooth, in accordance with embodiments.

FIG. 3B shows a polymeric shell appliance configured with one or more activation sites to store energy with a tooth at a target position and orientation comprising a non-extruded position and orientation of the tooth. In the depicted embodiment, the force is oriented in an intrusive direction and insufficient to intrude the tooth and sufficient to inhibit extrusion of the tooth. The tooth receiving cavity of the polymeric shell appliance comprises a shape profile 50 in a free standing unloaded configuration. When the polymeric shell appliance receives the tooth, the activation site of the polymeric shell appliance deflects to deflected shape profile 55 in order to store energy and conforms to the shape profile 60 of the received tooth. The stored energy provides a force 70 oriented in an intrusive direction that is insufficient to intrude the tooth.

Alternatively, the target position and orientation comprises a non-intruded position and orientation of the tooth, and the force is oriented in an extrusive direction and insufficient to extrude the tooth and sufficient to inhibit intrusion of the tooth.

Figure 4:
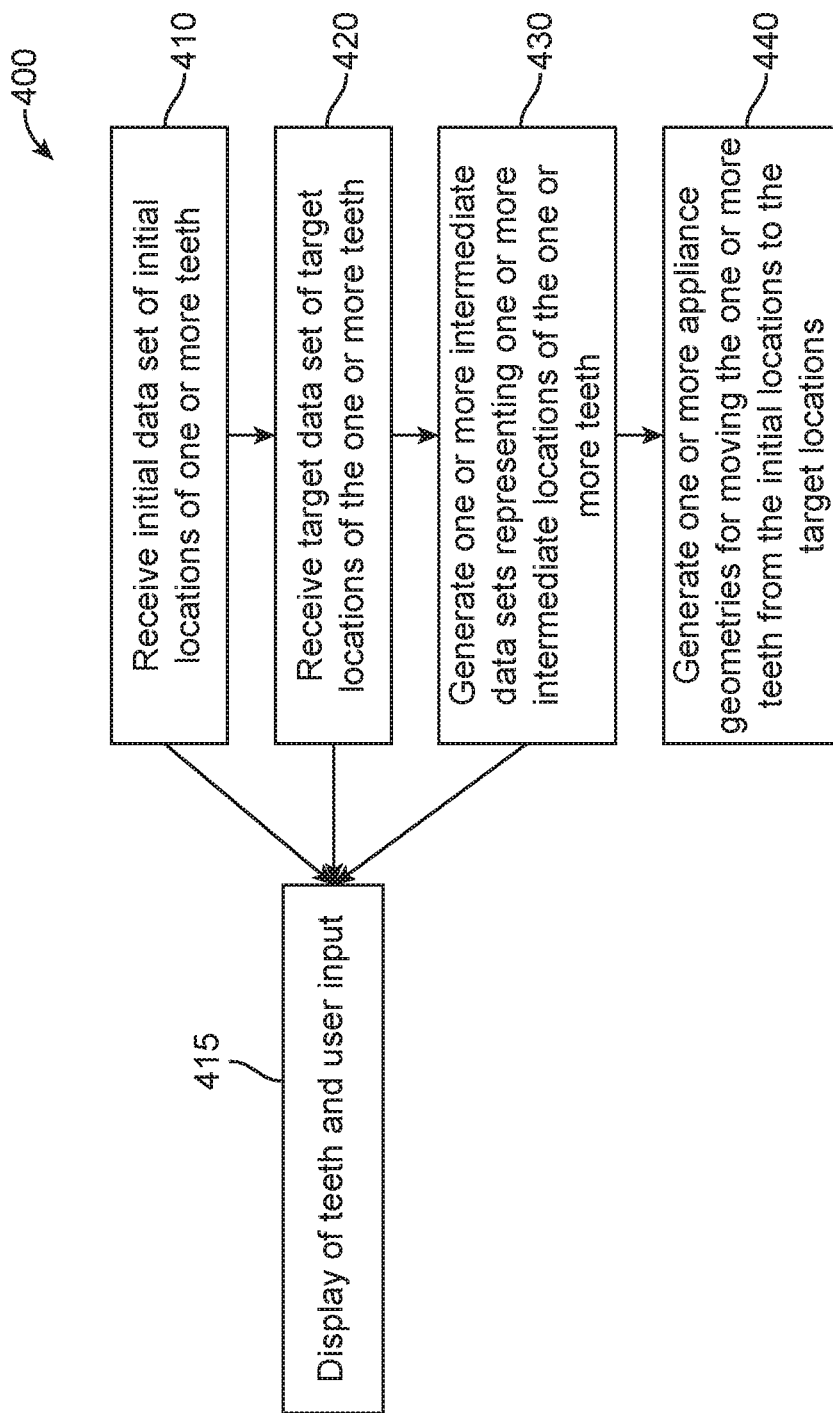
FIG. 4 shows a method of determining tooth receiving cavities of an appliance away from the target locations, in accordance with embodiments.

FIG. 4 shows a method 400 of determining tooth receiving cavities of an appliance away from the target locations in accordance with embodiments. Some or all of the steps of the method 400 can be performed by one or more processors. In many embodiments, some or all of the steps of the method 400 are performed automatically without requiring user input. Alternatively or in addition, some or all of the steps of the method 400 may involve user input, e.g., received via a user input interface or device.

In step 410, an initial data set of initial locations of one or more teeth is received. The initial data set can represent an initial arrangement of the patient's teeth, for example. The initial data set can comprise one or more three-dimensional digital models of the teeth in an initial arrangement, e.g., obtained via scanning techniques known to one of skill in the art.

In a step 415, the initial data set is manipulated by the user to determine target locations of one or more teeth for each of a plurality of stages of treatment. In many embodiments, the user (e.g., an orthodontic practitioner or technician) inputs commands via a user interface (e.g., a user interface implemented as part of treatment planning software and presented to the user on a display) in order to specify the target locations for the teeth. For example, the teeth of the initial data set can be segmented from each other so as to be individually manipulable, and the user can move each tooth from the initial location to the target location. The user can view and teeth and determine that the locations of the teeth are suitable for each of a plurality of treatment stages.

In step 420, a target data set of target locations of the one or more teeth is received. The target data set can represent a target arrangement of the patient's teeth that is desired to be achieved through treatment with the appliances described herein.

The processor system may comprise instructions to include an attachment on one or more of the plurality of teeth. In many embodiments, the processor system comprises instructions to determine a shape of an attachment and an attachment engaging structure of the appliances.

Alternatively or in combination, the processor system may comprise instructions to include an external force producing mechanism coupled to one or more of the plurality of teeth. In many embodiments, the processor system comprises instructions to determine a shape and location of an external force producing mechanism in order to exert a targeted force onto one or more teeth, e.g., to back up anchorage of posterior teeth as described herein.

In step 430, one or more intermediate data sets representing one or more intermediate locations of the one or more teeth are generated. Each intermediate data set can correspond to a treatment stage comprising an intermediate arrangement of the teeth between the initial arrangement and the target arrangement. In many embodiments, the intermediate data sets represent a sequence of successive tooth arrangements traversed by the one or more teeth as they move from their initial locations to their target locations. Optionally, the intermediate data sets can be displayed to the user (e.g., as manipulable three-dimensional digital tooth models on a display) to allow the user to directly view and/or modify the intermediate arrangements as desired. In alternative embodiments, the intermediate data sets are not displayed to the user, such that treatment staging of step 430 is performed automatically without involving any user input.

In step 440, one or more appliance geometries for moving the one or more teeth from the initial locations to the target locations are generated. The geometries can comprise geometries (e.g., positions, orientations, inner surface profiles, attachment engagement structures) for tooth receiving cavities of the appliances described herein. Various techniques can be used to determine appropriate appliance geometries for moving the teeth. For instance, each appliance can be designed to move one or more teeth from a previous arrangement to a subsequent arrangement in the sequence of initial, intermediate, and target arrangements. Optionally, the appliance can be designed to retain one or more teeth when the locations of the teeth in the previous and subsequent arrangements do not change (e.g., anchor teeth). In many embodiments, the geometry of each appliance is shaped to impart a force system on each tooth (e.g., directly on the tooth surface or indirectly via tooth-mounted attachments) in order to elicit the desired tooth movement (or retention). The force system can comprise any suitable combination of forces, counter forces, moments, or counter moments, as provided herein. For example, the appliance geometry can be designed to elicit a paired moment and counter moment on a tooth (or a plurality of teeth) when worn by the patient in order to generate a differential moment for controlling tooth movement, as described herein. The processor may comprise instructions to include an attachment in response to a target differential moment to a tooth in order to move a tooth in a target direction. The processor may comprise instructions to include an external force producing mechanism in order to modify a force system applied to one or more teeth.

In many embodiments, the processor system comprises instructions to determine one or more forces as described herein. The processor system may comprise instructions to determine one or more of a first force about a first center of resistance of a first tooth, the first center of resistance of the first tooth, a first counter force of the first tooth, a first moment about the first tooth, a first counter force of the first tooth, a first counter moment of the first tooth, the first force opposite the second force, the first moment opposite the second moment, a sum of the first force and the second force, the sum of the first force along a targeted direction of tooth movement, and iterations thereof for the first tooth to move the first tooth in a targeted direction. The processor system can be configured to determine each of these forces for a second tooth, and similar forces for each of a plurality of teeth.

In many embodiments, the tooth arrangement of an appliance is away from (offset from or different from) the corresponding tooth arrangement desired to be achieved by wearing the appliance. For example, at least one tooth receiving cavity of the appliance can comprise a position and/or orientation away from the desired position and/or orientation of the corresponding received tooth. This offset between the appliance geometry and the corresponding desired tooth arrangement can allow for more precise control and application of force systems for moving (or retaining) teeth (e.g., via the application of differential moments). This approach can be advantageous compared to alternative approaches where the appliance geometry is shaped to match the desired tooth arrangement (e.g., the positions and/or orientations of tooth receiving cavities match the desired positions and/or orientations of the teeth). Tooth response data for achieved movements in response to a movement goal and related forces suitable for incorporation in accordance with embodiments disclosed herein are described in described in U.S. application Ser. No. 12/623,340, filed on Nov. 20, 2009, published as U.S. 2010/0138025 on Jun. 3, 2010, entitled "Orthodontic systems and methods including parametric attachments" and U.S. application Ser. No. 13/865,091, filed on Apr. 17, 2013, published as U.S. 2013/0230818, entitled "Method and system for optimizing dental aligner geometry," the entire disclosures of which have been previously incorporated herein by reference. The appliance can be designed with tooth receiving cavities positioned and/or oriented in response to tooth movement data and the target tooth position for each of a plurality of teeth for each of a plurality of stages of the treatment. In many embodiments, the use of appliance geometries that do not match the corresponding tooth arrangements as described herein can improve the performance of orthodontic appliances for achieving planned tooth movements.

In many embodiments, the generated appliance geometries are not displayed to the user, such that the user only sees the sequence of successive tooth arrangements for moving the teeth, without seeing the corresponding appliance geometries used to achieve such arrangements. This can be beneficial for simplifying and streamlining the information that is presented to the user, particularly when the appliance geometries comprising the positions and orientations of the shape profiles of the tooth receiving cavities are offset from the desired tooth arrangements for each of a plurality of stages of treatment.

Optionally, following step 440, the generated appliance geometries can be output, e.g., as instructions for controlling a fabrication machine for manufacturing orthodontic appliances having the specified geometries, and optionally tooth attachments and/or external force producing mechanisms to be used in conjunction with the appliances.

Although the above steps show method 400 of determining appliance geometries in accordance with embodiments, a person of ordinary skill in the art will recognize many variations based on the teaching described herein. Some of the steps may comprise sub-steps. Many of the steps may be repeated as often as is beneficial. Some of the steps can be removed, and additional steps provided. One or more steps of the method 400 may be performed with any data processing system, such as the embodiments described herein. Some of the steps may be optional, such as step 430. The order of the steps can be varied. For example, steps 410, 415, 420, and 430 may be performed in any suitable order.

Figure 5:
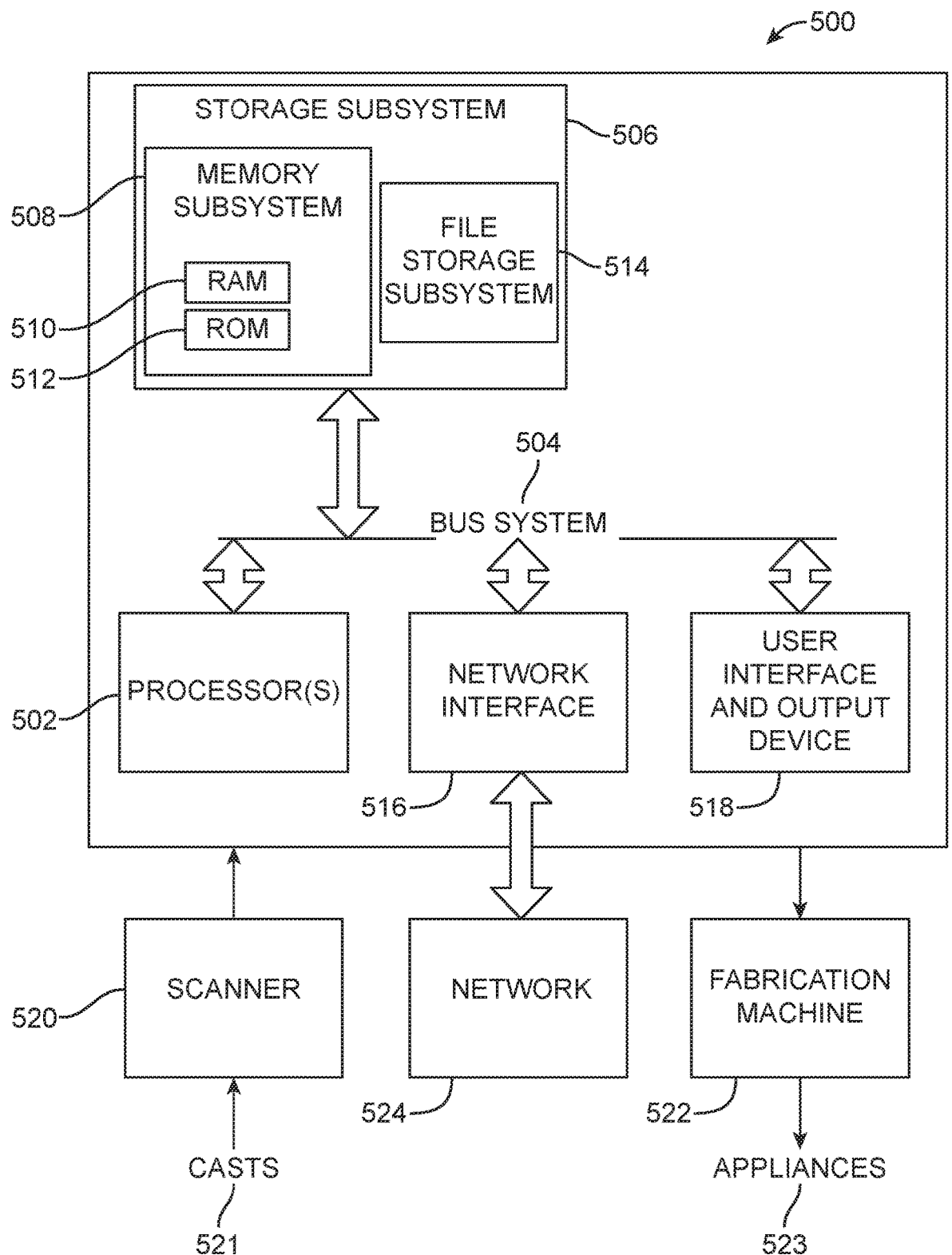
FIG. 5 shows a simplified block diagram of a data processing system, in accordance with embodiments.

FIG. 5 is a simplified block diagram of a data processing system 500 that may be used in executing methods and processes described herein in accordance with embodiments. The data processing system 500 typically includes at least one processor 502 that communicates with one or more peripheral devices via bus subsystem 504. These peripheral devices typically include a storage subsystem 506 (memory subsystem 508 and file storage subsystem 514), a set of user interface input and output devices 518, and an interface to outside networks 516. This interface is shown schematically as "Network Interface" block 516, and is coupled to corresponding interface devices in other data processing systems via communication network interface 524. Data processing system 500 can include, for example, one or more computers, such as a personal computer, workstation, mainframe, laptop, and the like.

The user interface input devices 518 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 506 maintains the basic required programming, including computer readable media having instructions (e.g., operating instructions, etc.), and data constructs. The program modules discussed herein are typically stored in storage subsystem 506. Storage subsystem 506 typically includes memory subsystem 508 and file storage subsystem 514. Memory subsystem 508 typically includes a number of memories (e.g., RAM 510, ROM 512, etc.) including computer readable memory for storage of fixed instructions, instructions and data during program execution, basic input/output system, etc. File storage subsystem 514 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 520 includes any means for obtaining a digital representation (e.g., images, surface topography data, etc.) of a patient's teeth (e.g., by scanning physical models of the teeth such as casts 521, by scanning impressions taken of the teeth, or by directly scanning the intraoral cavity), which can be obtained either from the patient or from treating professional, such as an orthodontist, and includes means of providing the digital representation to data processing system 500 for further processing. Scanner 520 may be located at a location remote with respect to other components of the system and can communicate image data and/or information to data processing system 500, for example, via a network interface 524. Fabrication system 522 fabricates appliances 523 based on a treatment plan, including data set information received from data processing system 500. Fabrication machine 522 can, for example, be located at a remote location and receive data set information from data processing system 500 via network interface 524.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method comprising: coupling a dental appliance to a first set of teeth comprising a plurality of anterior teeth and a second set of teeth comprising a plurality of posterior teeth of a patient, the first set of teeth having a first plurality of attachments attached thereto and disposed between the first set of teeth and the dental appliance, and the dental appliance having a first plurality of activation regions and a second activation regions, the first plurality of activation regions being at a first plurality of locations corresponding to the first plurality of attachments, the dental appliance being a continuous dental appliance having a plurality of tooth receiving cavities shaped to receive the first and the second set of teeth and provide an opposing moment between the first and the second set of teeth,
   wherein the first set of teeth and the second set of teeth are separated by a space corresponding to a tooth gap formed by extraction or absence of teeth between the first set of teeth and the second set of teeth;
   providing a first plurality of forces and a first counter moment to the first set of teeth through the first plurality of activation regions and the first plurality of attachments, at least a portion of the first plurality of forces being configured to direct at least one tooth of the first set of teeth in a sagittal direction into the tooth gap toward the second set of teeth; and
   providing a second forces to the second set of teeth through the second one or more activation regions, at least a portion of the second forces being opposed to the first plurality of forces being configured to create a second counter moment in a direction opposing the first counter moment, wherein the first counter moment and the second counter moment are coupled to form a differential moment across the tooth gap.

2. The method of claim 1, wherein the second activation regions are at one or more locations corresponding to a second attachments attached to the second set of teeth.

3. The method of claim 1, wherein the first plurality of forces are configured to reduce a first resistance to movement due to a first one or more roots of the first set of teeth, and to urge the first set of teeth toward the second set of teeth.

4. The method of claim 1, wherein the at least a portion of the first plurality of forces are directed toward the second set of teeth.

5. The method of claim 1, wherein the space corresponding to the tooth gap is formed by extraction or absence of a premolar.

6. The method of claim 1, wherein the first plurality of activation regions and the first plurality of attachments are configured to facilitate translation of the first set of teeth toward the second set of teeth while reducing an unwanted torque on the first set of teeth.

7. The method of claim 1, wherein:
   a first and a second of the first plurality of attachments are located at a first and a second attachment position, respectively, the first attachment position located at a first distance from a gingiva and the second attachment position located at a second distance from the gingiva, the second distance being greater than the first distance.

8. The method of claim 1, wherein:
   a first and a second of the first plurality of attachments are located at a first and a second attachment position, respectively, the first attachment position located at a first distance from a gingiva and the second attachment position located at a second distance from the gingiva, the second distance being greater than the first distance; and
   the first attachment position and the second attachment position are configured to interact with the first plurality of activation regions to reduce a torque caused by a translational force of the dental appliance on a crown of at least one of the first set of teeth.

9. The method of claim 1, wherein the second forces are configured to anchor the second set of teeth at a particular position in order to resist the first plurality of forces.

10. The method of claim 2, wherein: the second forces are configured to anchor the second set of teeth at a particular position in order to resist the first plurality of forces; and
    a third and a fourth of the second of attachments are located at a third and a fourth attachment position, respectively, the third attachment position located at a third distance from a gingiva and the fourth attachment position located at a fourth distance from the gingiva, the fourth distance being greater than the third distance.

11. The method of claim 10, wherein the third attachment position is located on a buccal side of the second set of teeth and the fourth attachment position is located on a lingual side of the second set of teeth.

12. The method of claim 1, wherein the first plurality of forces and the second forces are provided as part of a treatment plan.

13. A method comprising: coupling a first dental appliance to a first set of teeth comprising a plurality of anterior teeth and a second set of teeth comprising a plurality of posterior teeth of a patient, the first set of teeth having a first plurality of attachments attached thereto and disposed between the first set of teeth and the dental appliance, and the first dental appliance having a first plurality of activation regions and a second one or more activation regions, the first plurality of activation regions being at a first plurality of locations corresponding to the first plurality of attachments, the first dental appliance being a continuous dental appliance,
wherein the first set of teeth and the second set of teeth are separated by a space corresponding to a tooth gap formed by extraction or absence of teeth between the first set of teeth and the second set of teeth;
providing a first plurality of forces and a first counter moment to the first set of teeth through the first plurality of activation regions and the first plurality of attachments, at least a portion of the first plurality of forces being configured to direct the first set of teeth in a sagittal direction into the gap toward the second set of teeth from a first position to a second position;
providing a second plurality of forces to the second set of teeth through the second plurality of activation regions, at least a portion of the second forces being opposed to the first plurality of forces and being configured to create a second counter moment in a direction opposing the first counter moment;
uncoupling the first dental appliance from the first set of teeth and the second set of teeth;
coupling a second dental appliance to the first set of teeth and the second set of teeth, the second dental appliance having a third plurality of activation regions and a fourth plurality of activation regions, the third plurality of activation regions being at a third plurality of locations corresponding to the first plurality of attachments, the second dental appliance being a continuous dental appliance;
providing a third plurality of forces and a third counter moment to the first set of teeth through the third plurality of activation regions and the first plurality of attachments, at least a portion of the third plurality of forces being configured to direct the first set of teeth toward the second set of teeth from the second position to a third position; and
providing a fourth plurality of forces to the second set of teeth through the fourth plurality of activation regions, at least a portion of the fourth plurality of forces being opposed to the third plurality of forces and being configured to create a fourth counter moment in a direction opposing the third counter moment,
wherein the first counter moment and the second counter moment are coupled to form a differential moment across the tooth gap.

14. The method of claim 13, wherein the space corresponding to the tooth gap is formed by extraction or absence of a premolar.

15. The method of claim 13, wherein:
a first and a second of the first plurality of attachments are located at a first and a second attachment position, the first attachment position comprising a first attachment position at a first distance from a gingiva and the second attachment position comprising a second attachment position at a second distance from the gingiva, the second distance being greater than the first distance.

16. The method of claim 13, wherein:
a first and a second of the first plurality of attachments are located at a first and a second attachment position, the first attachment position comprising a first attachment position at a first distance from a gingiva and the second attachment position comprising a second attachment position at a second distance from the gingiva, the second distance being greater than the first distance; and
the first attachment position and the second attachment position are configured to interact with the first plurality of activation regions to reduce a torque caused by a translational force of the first dental appliance on a crown of at least one of the first set of teeth.

17. A method comprising: coupling a dental appliance to a first set of teeth comprising a plurality of anterior teeth and a second set of teeth comprising a plurality of posterior teeth of a patient, the first set of teeth having a first plurality of attachments attached thereto and disposed between the first set of teeth and the dental appliance, and the dental appliance having a first plurality of activation regions and a second plurality of activation regions, the first plurality of activation regions being at a first plurality of locations corresponding to the first plurality of attachments, the dental appliance being a continuous dental appliance,
wherein the first set of teeth and the second set of teeth are separated by a space corresponding to a tooth gap formed by extraction or absence of teeth between the first set of teeth and the second set of teeth;
directing the first set of teeth in a sagittal direction into the tooth gap toward the second set of teeth using a first plurality of forces and a first counter moment provided to the first set of teeth through the first plurality of activation regions and the first plurality of attachments; and
opposing the first plurality of forces with a second plurality of forces and a second counter moment in a direction opposing the first counter moment provided to the second set of teeth through the second plurality of activation regions, wherein the first counter moment and the second counter moment are coupled to form a differential moment across the tooth gap.

18. The method of claim 17, wherein directing the first set of teeth toward the second set of teeth comprises:
reducing a first resistance to movement due to a first roots of the first set of teeth; and
urging the first set of teeth toward the second set of teeth.

19. The method of claim 17, further comprising translating the first set of teeth toward the second set of teeth while reducing unwanted torque on the first set of teeth using the first plurality of activation regions and the first plurality of attachments.

20. The method of claim 17, wherein the space corresponding to the tooth gap is formed by extraction or absence of a premolar.

21. The method of claim 17, wherein the method is executed as part of a treatment plan.

22. A method comprising: coupling a first dental appliance to a first set of teeth comprising a plurality of anterior teeth and a second set of teeth comprising a plurality of posterior teeth of a patient, the first set of teeth having a first plurality of attachments attached thereto and disposed between the first set of teeth and the dental appliance, and the dental appliance having a first plurality of activation regions and a second plurality of activation regions, the first plurality of activation regions being at a first plurality of locations corresponding to the first plurality of attachments, the first dental appliance being a continuous dental appliance having a plurality of tooth receiving cavities shaped to receive the first and the second set of teeth, wherein the first set of teeth and the second set of teeth are separated by a space corresponding to a tooth gap formed by extraction of teeth between the first set of teeth and the second set of teeth;

directing the first set of teeth in a sagittal direction into the tooth gap toward the second set of teeth from a first position to a second position using a first plurality of forces and a first counter moment provided to the first set of teeth through the first plurality of activation regions and the first plurality of attachments;

opposing the first plurality of forces with a second plurality of forces provided to the second set of teeth through the second plurality of activation regions;

opposing the first counter moment with a second counter moment, the second counter moment being in a direction opposing the first counter moment and being provided to the second set of teeth though the second plurality of activation regions, wherein the first counter moment and the second counter moment are coupled to form a differential moment across the tooth gap;

uncoupling the first dental appliance from the first set of teeth and the second set of teeth;

coupling a second dental appliance to the first set of teeth and the second set of teeth, the second dental appliance having a third plurality of activation regions and a fourth plurality of activation regions, the third plurality of activation regions being at a third plurality of locations corresponding to the first plurality of attachments, the second dental appliance being a continuous dental appliance having a plurality of tooth receiving cavities shaped to receive the first and the second set of teeth;

directing the first set of teeth toward the second set of teeth from the second position to a third position using a third plurality of forces and a third counter moment provided to the first set of teeth through the third plurality of activation regions and the first plurality of attachments;

opposing the third forces with a fourth plurality of forces provided to the second set of teeth through the second dental appliance;

and opposing the third counter moment with a fourth counter moment, the fourth counter moment being in a direction opposing the third counter moment and being provided to the second set of teeth though the fourth plurality of activation regions.

23. The method of claim 22, wherein the method is executed as part of a treatment plan.

* * * * *